United States Patent
Noh et al.

(10) Patent No.: US 11,064,519 B2
(45) Date of Patent: *Jul. 13, 2021

(54) METHOD, DEVICE, AND SYSTEM FOR TRANSMITTING SIGNALS IN UNLICENSED BAND

(71) Applicant: Beijing Xiaomi Mobile Software Co., Ltd., Beijing (CN)

(72) Inventors: Minseok Noh, Seoul (KR); Jinsam Kwak, Gyeonggi-do (KR); Juhyung Son, Gyeonggi-do (KR)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,633

(22) Filed: Dec. 6, 2019

(65) Prior Publication Data

US 2020/0112985 A1   Apr. 9, 2020

Related U.S. Application Data

(63) Continuation of application No. 15/968,688, filed on May 1, 2018, now Pat. No. 10,542,561, which is a
(Continued)

(30) Foreign Application Priority Data

Nov. 4, 2015 (KR) .................. 10-2015-0154354
Jan. 15, 2016 (KR) .................. 10-2016-0005498
Jan. 18, 2016 (KR) .................. 10-2016-0005936

(51) Int. Cl.
*H04W 74/00* (2009.01)
*H04L 5/00* (2006.01)
(Continued)

(52) U.S. Cl.
CPC .......... *H04W 74/006* (2013.01); *H04L 5/005* (2013.01); *H04L 5/0053* (2013.01);
(Continued)

(58) Field of Classification Search
None
See application file for complete search history.

(56) References Cited

U.S. PATENT DOCUMENTS 8,483,107 B2   7/2013 Ahn et al.
2012/0250631 A1   10/2012 Hakola et al.
(Continued)

FOREIGN PATENT DOCUMENTS

EP   3 131 223   2/2017
WO   2016/119753   8/2016
(Continued)

OTHER PUBLICATIONS

T. Novlan, B. L. Ng, H. Si and J. C. Zhang, "Overview and evaluation of licensed assisted access for LTE-advanced," 2015 49th Asilomar Conference on Signals, Systems and Computers, Pacific Grove, CA, USA, 2015, pp. 1031-1035, doi: 10.1109/ACSSC.2015.7421295. (Year: 2015).*
(Continued)

*Primary Examiner* — Ayaz R Sheikh
*Assistant Examiner* — Tarell A Hampton
(74) *Attorney, Agent, or Firm* — Finnegan, Henderson, Farabow, Garrett & Dunner, L.L.P.

(57) ABSTRACT

A method, a device, and a system for transmitting a downlink signal is provided. The method includes monitoring a first common control channel indicating a downlink (DL) interval of subframe (SF) #(n−1) and SF #n, monitoring a second common control channel indicating a DL interval of SF #n and SF #(n+1), and performing a DL reception process in the SF #n based on a detection result of the first
(Continued)

common control channel and a detection result of second common control channel. The DL interval represents occupied OFDM symbols in a DL subframe.

16 Claims, 21 Drawing Sheets

Related U.S. Application Data continuation of application No. PCT/KR2016/012660, filed on Nov. 4, 2016.

(51) Int. Cl.
  *H04L 27/26* (2006.01)
  *H04W 16/14* (2009.01)
  *H04W 72/04* (2009.01)
  *H04W 74/08* (2009.01)
  *H04W 72/12* (2009.01)
  *H04W 72/14* (2009.01)

(52) U.S. Cl.
  CPC ......... *H04L 27/2602* (2013.01); *H04W 16/14* (2013.01); *H04W 72/0446* (2013.01); *H04L 5/001* (2013.01); *H04W 72/1289* (2013.01); *H04W 72/14* (2013.01); *H04W 74/0808* (2013.01)

(56) References Cited

U.S. PATENT DOCUMENTS

| | | |
|---|---|---|
| 2015/0049741 A1 | 2/2015 | Chen et al. |
| 2015/0270936 A1 | 9/2015 | Han et al. |
| 2016/0212735 A1 | 7/2016 | Nogami et al. |
| 2016/0302230 A1 | 10/2016 | Novlan et al. |
| 2016/0345206 A1 | 11/2016 | Yerramalli et al. |
| 2017/0048718 A1 | 2/2017 | Kim et al. |
| 2017/0048828 A1 | 2/2017 | Um et al. |
| 2017/0093542 A1 | 3/2017 | Li et al. |
| 2017/0127414 A1 | 5/2017 | Yi et al. |
| 2017/0141897 A1 | 5/2017 | Seo et al. |
| 2017/0142743 A1 | 5/2017 | Yoon et al. |
| 2017/0142751 A1 | 5/2017 | Liu et al. |
| 2017/0289818 A1 | 10/2017 | Ng et al. |
| 2017/0339704 A1 | 11/2017 | Matsumoto et al. |
| 2018/0069653 A1 | 3/2018 | Fujishiro et al. |
| 2018/0069660 A1 | 3/2018 | Yi et al. |
| 2018/0103458 A1 | 4/2018 | Tooher et al. |
| 2018/0115981 A1 | 4/2018 | Kim et al. |
| 2018/0213386 A1 | 7/2018 | Kim et al. |
| 2018/0220420 A1 | 8/2018 | Harada et al. |
| 2018/0220459 A1 | 8/2018 | Park et al. |
| 2018/0234988 A1 | 8/2018 | Shimezawa et al. |
| 2018/0249484 A1 | 8/2018 | Kim et al. |
| 2018/0249497 A1 | 8/2018 | Noh et al. |
| 2018/0302195 A1 | 10/2018 | Kim et al. |
| 2018/0302203 A1* | 10/2018 | Kim ............... H04J 11/0073 |
| 2018/0302926 A1 | 10/2018 | Bhorkar et al. |
| 2018/0323923 A1 | 11/2018 | Wang et al. |
| 2019/0037483 A1 | 1/2019 | Li et al. |
| 2019/0261388 A1 | 8/2019 | Yoon et al. |

FOREIGN PATENT DOCUMENTS

| | | |
|---|---|---|
| WO | 2016/121603 | 8/2016 |
| WO | 2017/078463 | 5/2017 |

OTHER PUBLICATIONS

A. Mukherjee et al., "System architecture and coexistence evaluation of licensed-assisted access LTE with IEEE 802.11," 2015 IEEE International Conference on Communication Workshop (ICCW), London, UK, 2015, pp. 2350-2355, doi: 10.1109/ICCW.2015.7247532. (Year: 2015).*
International Search Report for PCT/KR2016/012660 dated Mar. 7, 2017 and its English translation from WIPO (published as WO 2017/078463).
Written Opinion of the International Searching Authority for PCT/KR2016/012660 dated Mar. 7, 2017 and its English machine translation from WIPO (published as WO 2017/078463).
International Preliminary Report on Patentability (Chapter I) for PCT/KR2016/012660 dated Mar. 8, 2018 and its English translation from WIPO (published as WO 2017/078463).
ITRI, "Discontinuous Transmission for LAA", R1-151572, 3GPP TSG RAN WG1 Meeting #80bis, Belgrade, Serbia, Apr. 10, 2015. See sections 2-2.2.
Samsung, "Remaining Details of DRS Design", R1-155465, 3GPP TSG RAN WG1 Meeting #82bis, Malmo, Sweden, Sep. 25, 2015. See sections 2.1-2.4.
Kyocera, "DL Transmission Design for Partial Subframe", R1-155531, 3GPP TSG RAN WG1 Meeting #82bis, Malmo, Sweden, Sep. 26, 2015. See section 2.
R1-153787, "Candidate starting positions of partial subframe and corresponding RS pattern for LAA." Source: Huawei, HiSillison. Agenda Item: 7.2.4.3. 3GPP TSG RAN WG1 Meeting #82, Beijing, China, Aug. 24-28, 2015.
R1-152921, "Indication of PDSCH in partial subframe." Source: Panasonic. Agenda Item: 6.2.4.3 3GPP TSG RAN WG1 Meeting #81, Fukuoaka, Japan, (May 25-29, 2015) (Year: 2015).
R1-155474, "Partial Subframe for LAA." Source: Samsung. Agenda Item: 7.2.3.3. 3GPP TSG WG1 #82bis, Malmo, Sweden (Oct. 5-9, 2015) Year: 2015).
Notice of Allowance dated Sep. 5, 2019 for U.S. Appl. No. 15/968,688 (now published as US 2018/0249497).
Office Action of Indian Application No. 201827016063, dated Jul. 27, 2020.

* cited by examiner and Korean Patent Application No. 10-2016-0005936 filed in the Korean Intellectual Property Office on Jan. 18, 2016, the entire contents of which are incorporated herein by reference.
METHOD, DEVICE, AND SYSTEM FOR TRANSMITTING SIGNALS IN UNLICENSED BAND

CROSS-REFERENCE TO RELATED APPLICATIONS

This application is a continuation of U.S. patent application Ser. No. 15/968,688 filed on May 1, 2018, which is a continuation of International Patent Application No. PCT/KR2016/012660 filed on Nov. 4, 2016, which claims the priority to Korean Patent Application No. 10-2015-0154354 filed in the Korean Intellectual Property Office on Nov. 4, 2015, Korean Patent Application No. 10-2016-0005498 filed in the Korean Intellectual Property Office on Jan. 15, 2016 and Korean Patent Application No. 10-2016-0005936 filed in the Korean Intellectual Property Office on Jan. 18, 2016, the entire contents of which are incorporated herein by reference.

TECHNICAL FIELD

The present invention relates to a wireless communication system. Specifically, the present invention relates to a method, device, and system for performing a signal in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting/receiving a signal in a wireless communication system, in particular, a cellular wireless communication system and an apparatus therefor. Further, the present invention has been made in an effort to provide a method for efficiently transmitting/receiving a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to an embodiment of the present invention, a method for a user equipment to receive a downlink signal in a cellular communication system includes monitoring a first common control channel indicating a downlink (DL) interval of subframe (SF) #(n−1) and SF #n; monitoring a second common control channel indicating a DL interval of SF #n and SF #(n+1); and performing a DL reception process in the SF #n based on a detection result of the first common control channel and a detection result of the second common control channel, wherein only a detection process for a first physical channel/signal is allowed in the DL reception process in SF #n when a detection of the first common control channel fails, a detection of the second common control channel is successful, and the DL interval of SF #n indicated by the second common control channel is a part a total OFDM symbols of SF #n, wherein the first physical channel/signal includes a Discovery Reference Signal (DRS). The DL interval may represent occupied OFDM symbols in a DL subframe.

According to another embodiment of the present invention, a user equipment used in a cellular wireless communication system includes: a wireless communication module; and a processor, wherein the processor is configured to monitor a first common control channel indicating a downlink (DL) interval of subframe (SF) #(n−1) and SF #n; monitors a second common control channel indicating a DL interval of SF #n and SF #(n+1); and performs a DL reception process in the SF #n based on a detection result of the first common control channel and a detection result of the second common control channel, wherein only a detection process for a first physical channel/signal is allowed in the DL reception process in SF #n when a detection of the first common control channel fails, a detection of the second common control channel is successful, and the DL interval of SF #n indicated by the second common control channel is a part of a total OFDM symbols of SF #n, wherein the first physical channel/signal includes a Discovery Reference Signal (DRS). The DL interval may represent occupied OFDM symbols in a DL subframe.

A reception process for a second physical channel/signal may be omitted in SF #n when the detection of the first common control channel fails, the detection of the second common control channel is successful, and the DL interval of SF #n is a part of SF #n, wherein the second physical channel/signal may not include the DRS.

The second physical channel/signal may include a Physical Downlink Control Channel (PDCCH), an Enhanced PDCCH (EPDCCH), and a Physical Downlink Shared Channel (PDSCH) for downlink transmission.

The first common control channel may be monitored in SF #(n−1), and the second common control channel may be monitored in SF #n.

SF #n may be included in a time window expecting DRS reception.

The time window expecting the DRS reception may include a DRS Measurement Timing configuration (DMTC).

The DMTC may be configured in a cell of an unlicensed band.

The first and second common control channels may include a Physical Downlink Control Channel (PDCCH) scrambled with a Cyclic Redundancy Check (CRC) by a Common Control Radio Network Temporary Identifier (CC-RNTI).

Advantageous Effects

According to exemplary embodiments of the present invention, provided are a method for efficiently transmitting/receiving a signal in a wireless communication system, in particular, a cellular wireless communication system and an apparatus therefor. Further, provided are a method for efficiently transmitting/receiving a signal in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DESCRIPTION OF DRAWINS

In order to help understand the present invention, the accompanying drawings which are included as a part of the Detailed Description provide embodiments of the present invention and describe the technical matters of the present invention together with the Detailed Description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
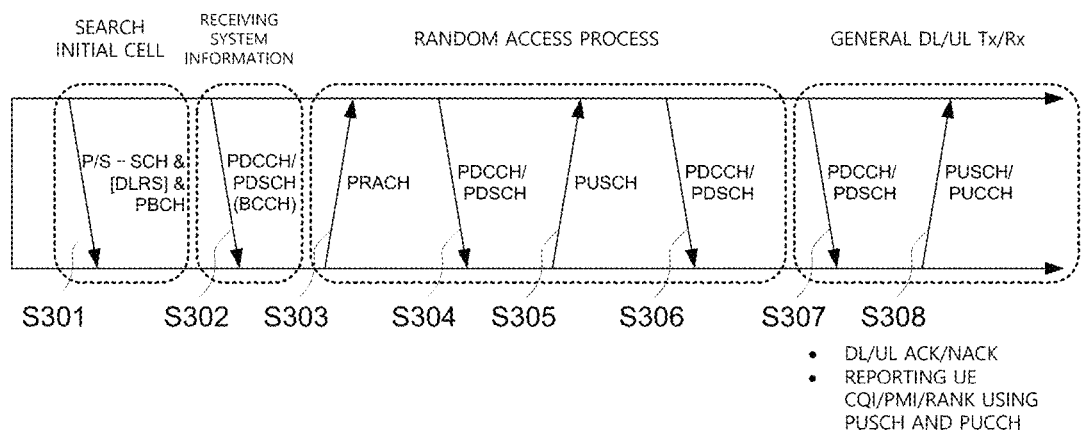
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. An user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
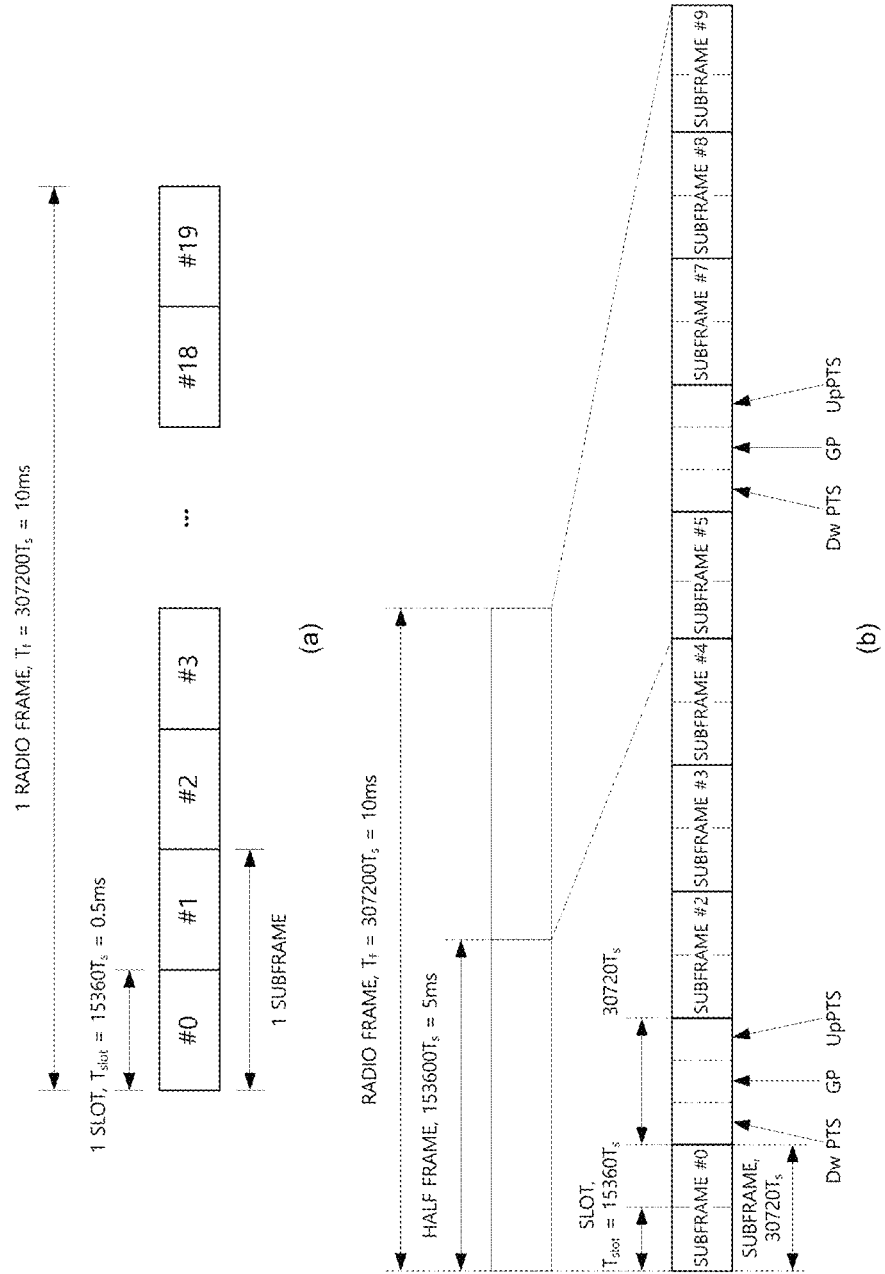
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band.

The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
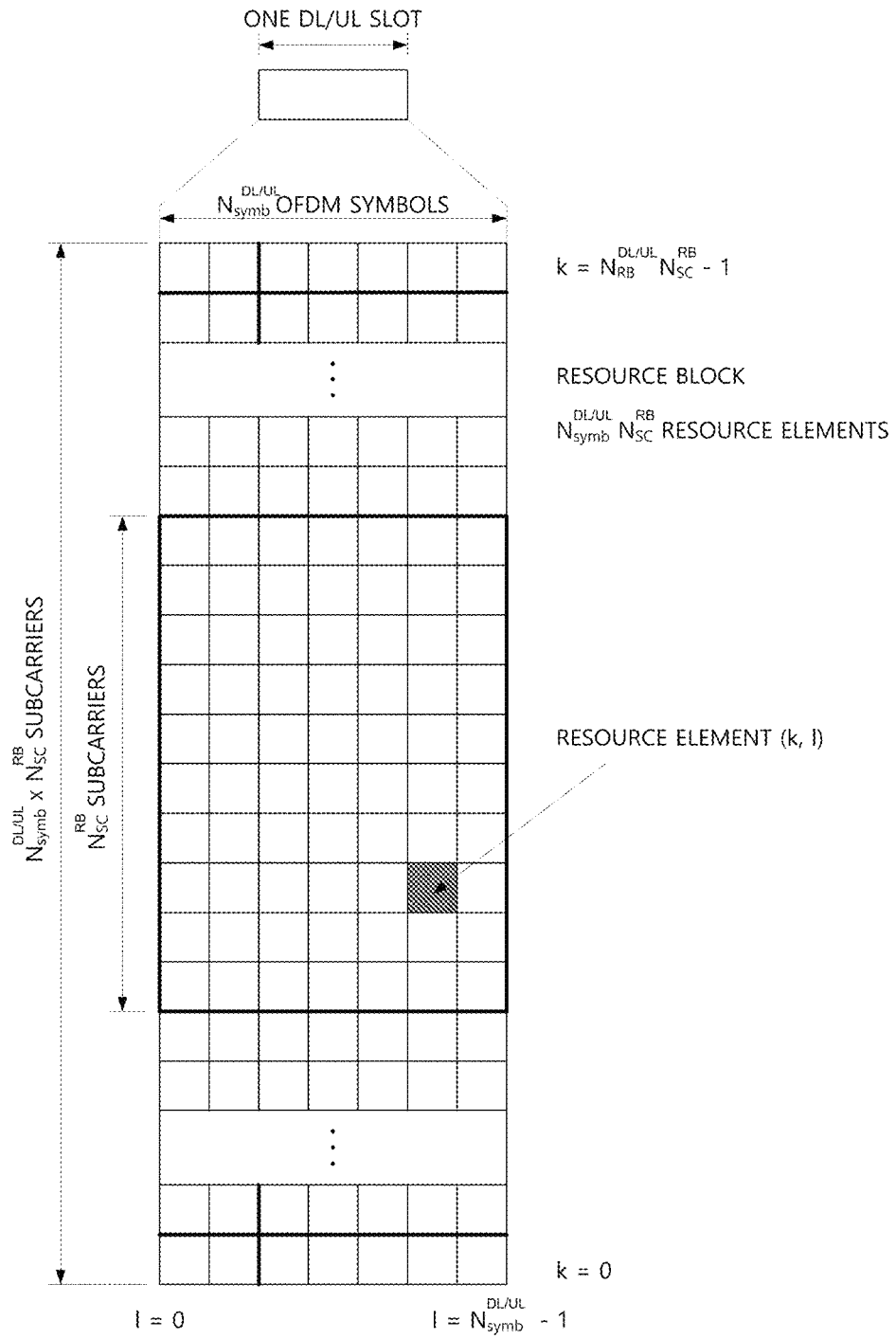
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain A resource constituted by one OFDM symbol and one subcarrier is referred to as a resource element (RE) or a tone. One RB is constituted by $N^{DL/UL}_{symb} * N^{RB}_{sc}$ resource elements.

The resource of the slot may be expressed as a resource grid constituted by $N^{DL/UL}_{RB} * \text{Nhu RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB} * N^{RB}_{sc} - 1$ in the frequency domain and 1 represents an index given with 0 to $N^{DL/UL}_{symb} - 1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
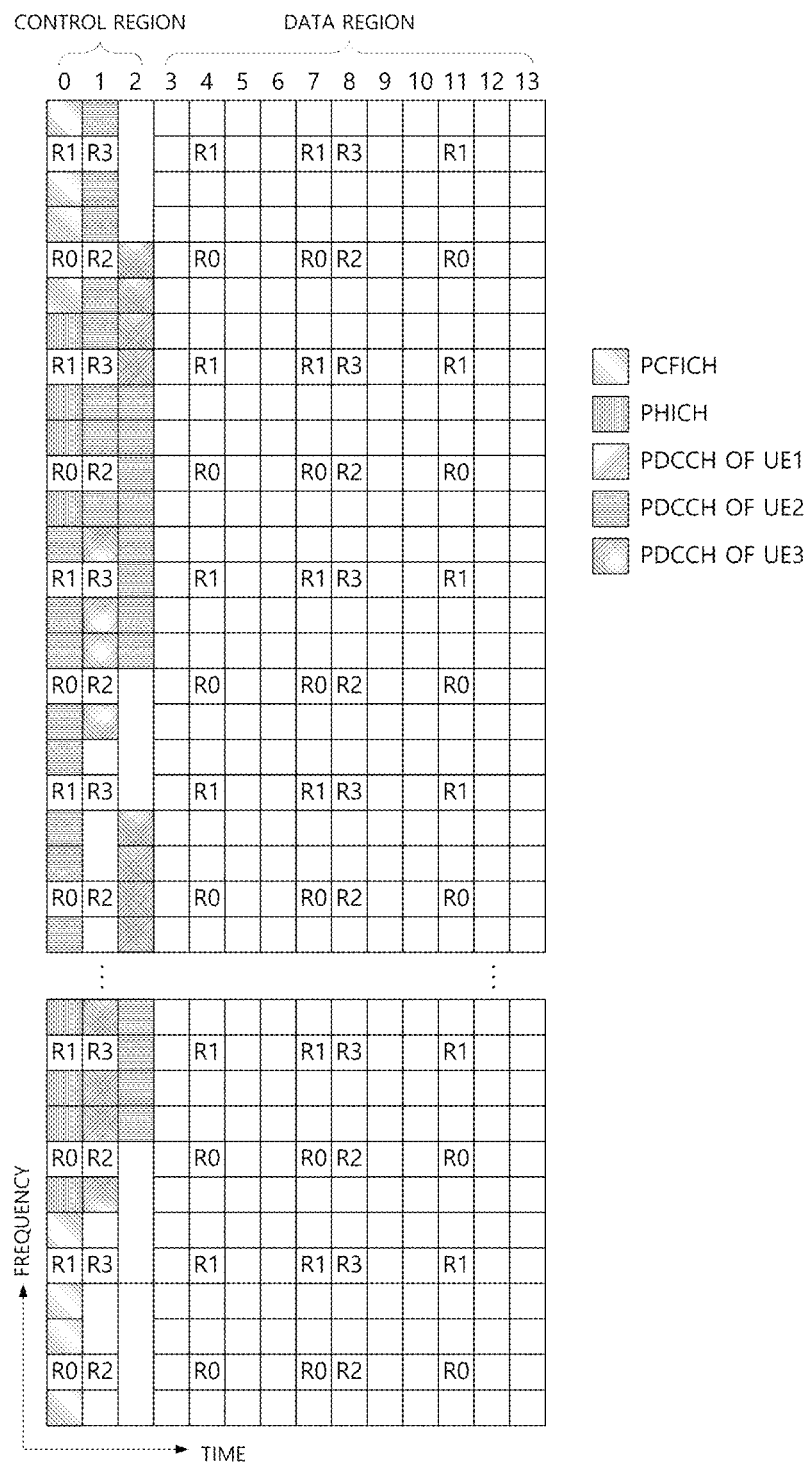
FIG. 4 illustrates a structure of a downlink subframe (SF).

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1(alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
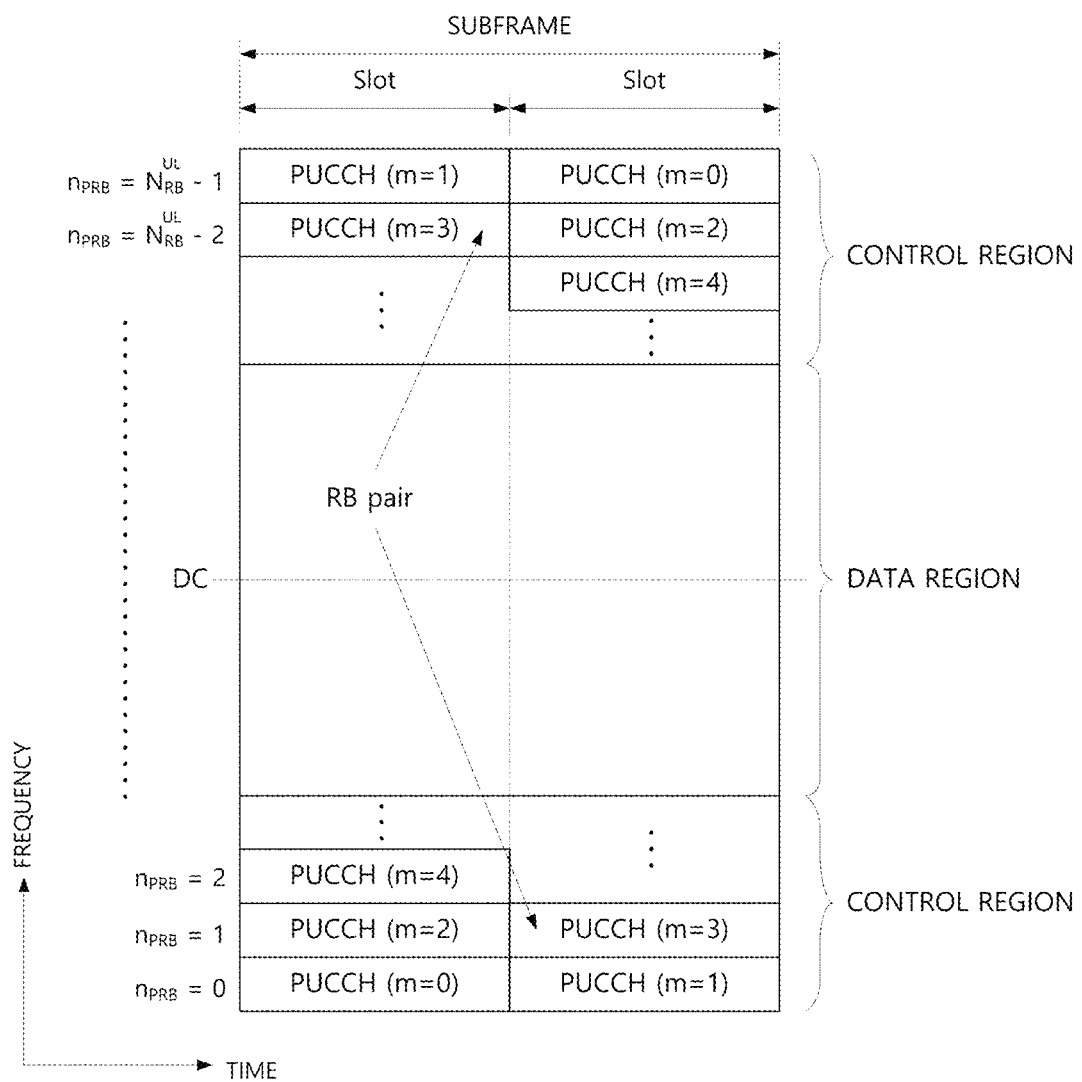
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
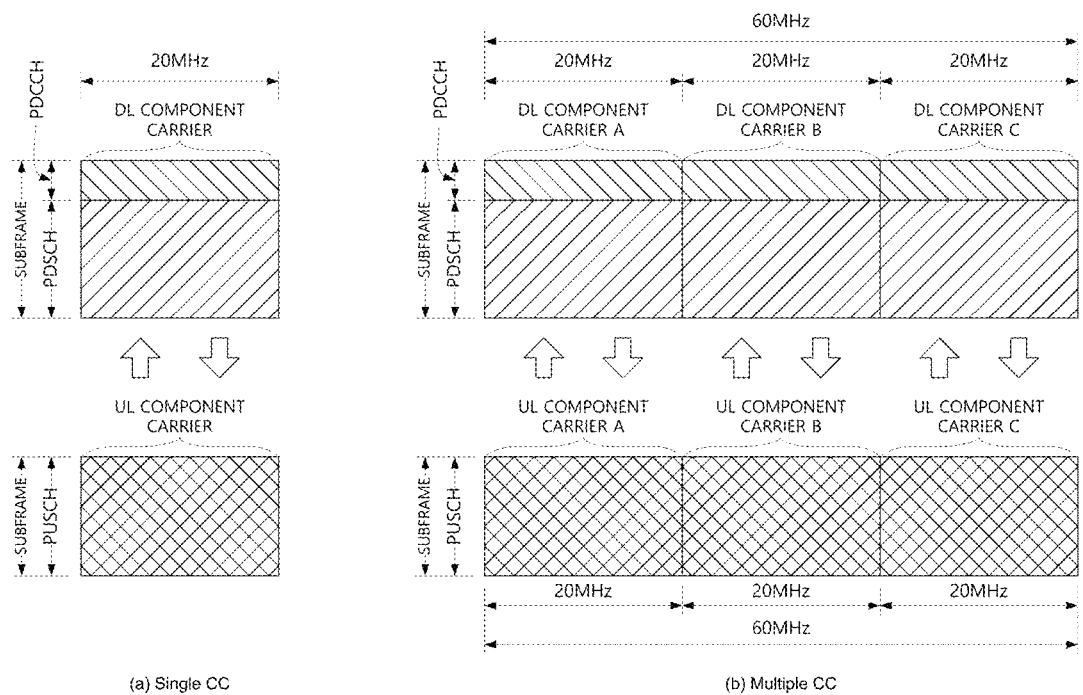
FIG. 6 is a diagram for describing single carrier communication and multi-carrier communication.

FIG. 6 is a diagram for describing single carrier communication and multi-carrier communication. FIG. 6A illustrates a subframe structure of a single carrier and FIG. 6B illustrates a subframe structure of multi-carriers which are carrier-aggregated.

Referring to FIG. 6A, in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6B, the carrier aggregation is distinguished from an OFDM system that performs DL/UL communication in a base frequency band divided into a plurality of subcarriers by using one carrier frequency, in that the carrier aggregation performs DL/UL communicationby using a plurality of carrier frequencies. Referring to FIG. 6B, three 20 MHz CCs are gathered in each of the UL and the DL to support a bandwidth of 60 MHz. The CCs may be adjacent to each other or non-adjacent to each other in the frequency domain. For convenience, FIG. 6B illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
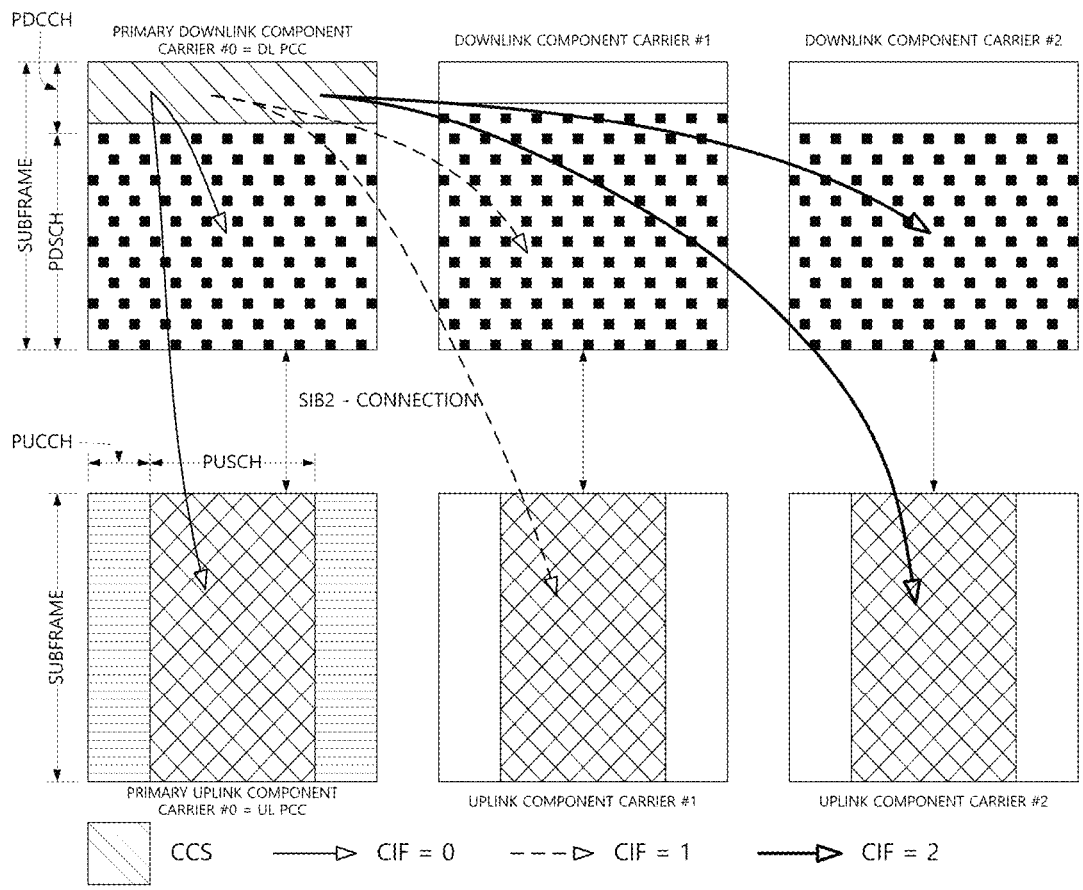
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
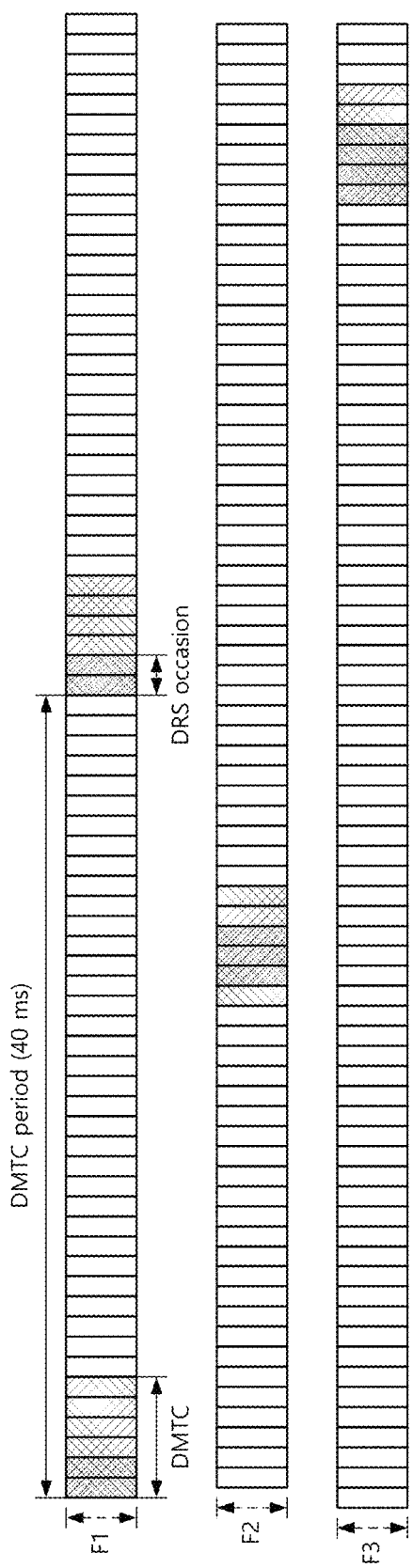
FIG. 8 illustrates Discovery Reference Signal (DRS) transmission.
Figure 9:
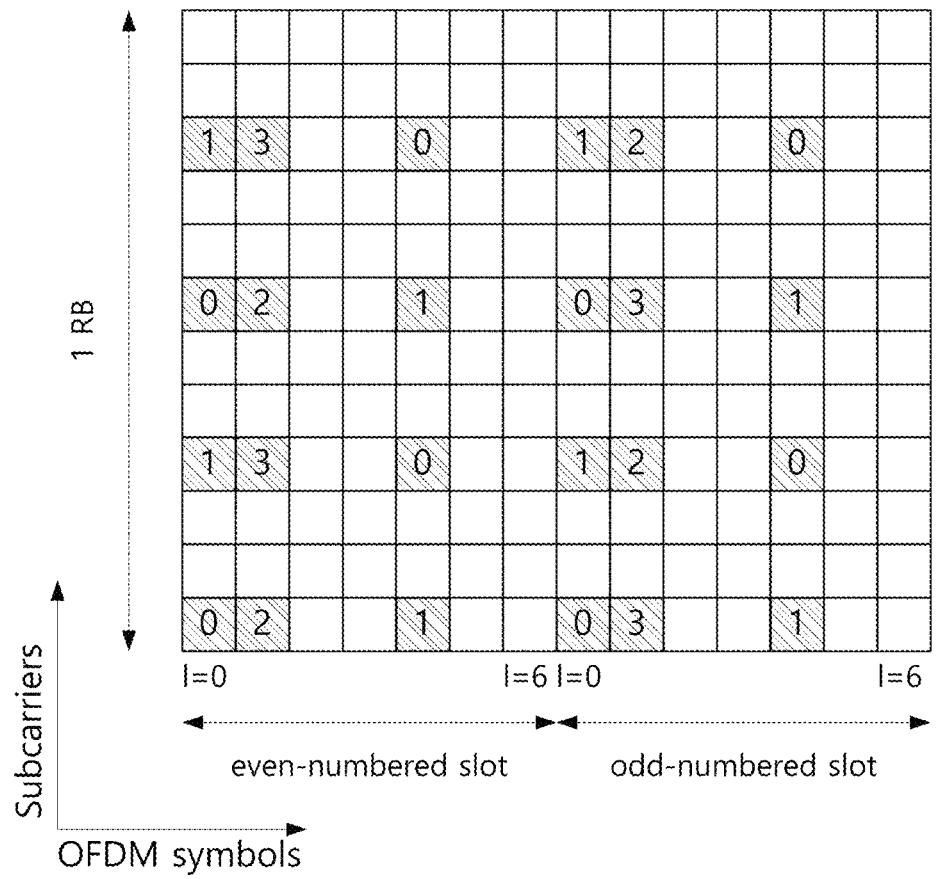
FIGS. 9 to 11 illustrate the structure of a reference signal used as DRS.
Figure 10:
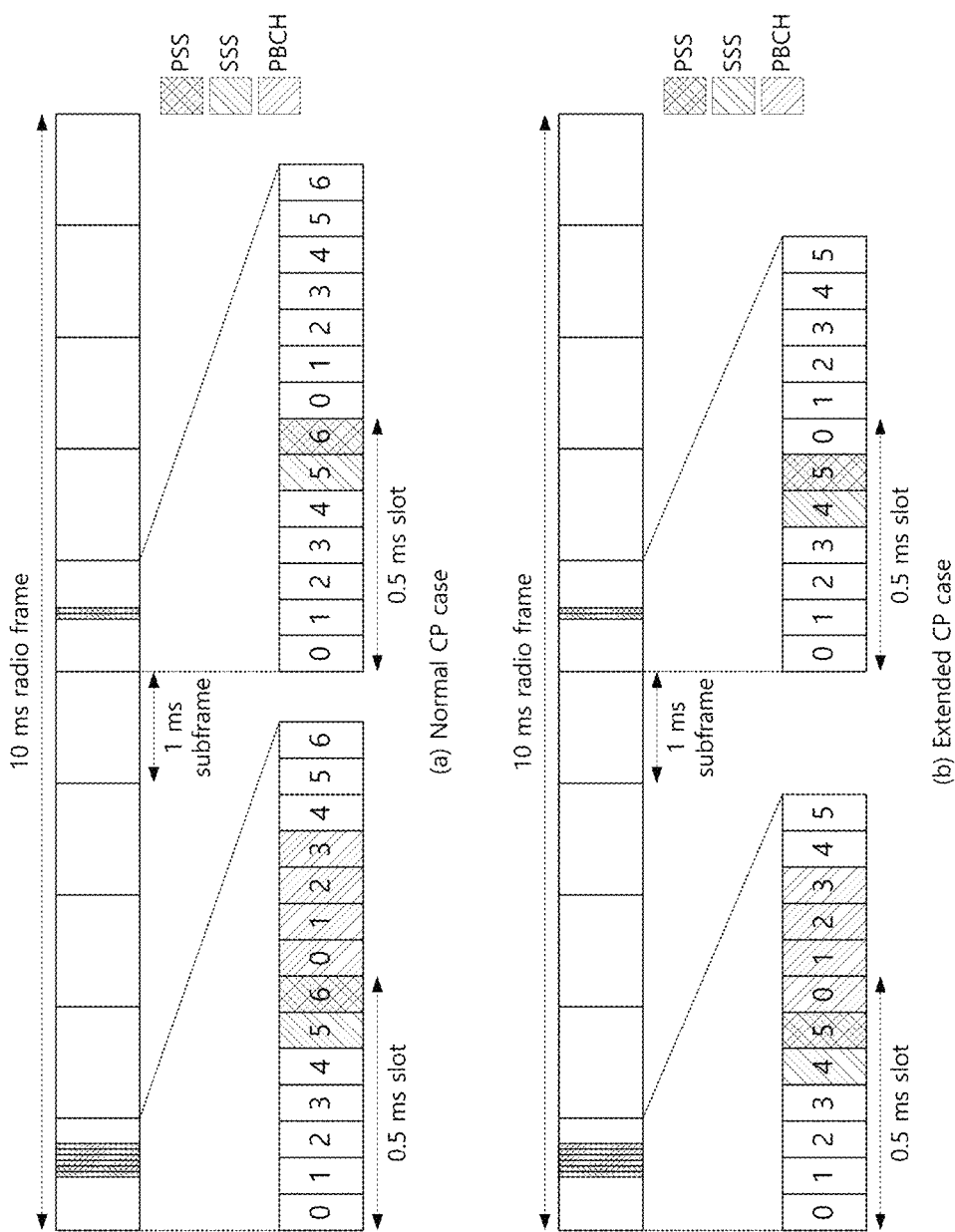
Figure 11:
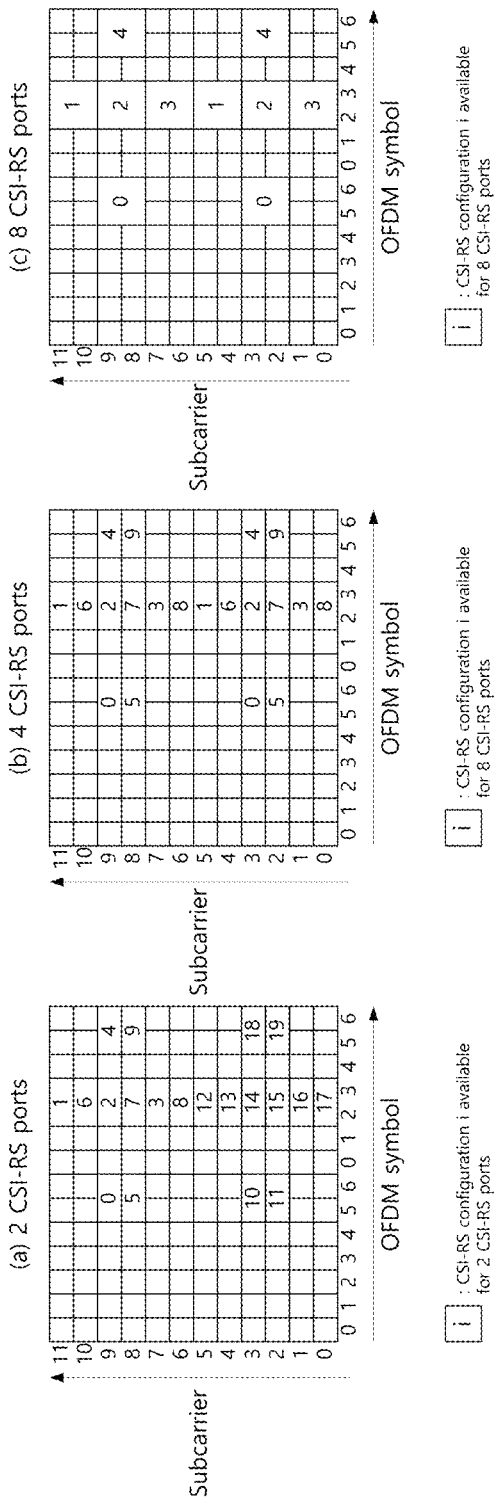

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.

Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.

Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
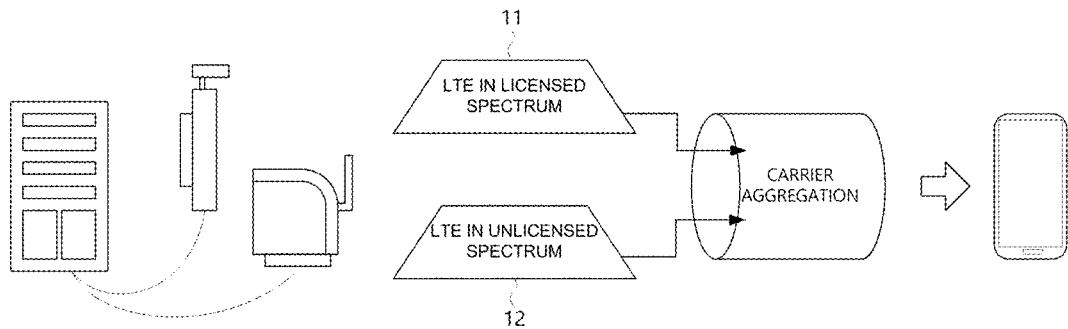
FIG. 12 illustrates a Licensed Assisted Access (LAA) service environment.

FIG. 12 illustrates a Licensed Assisted Access (LAA) service environment.

Referring to FIG. 12, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed (alternatively, authorized or permitted) band is referred to as LTE-licensed (LTE-L) and the LTE technology in the unlicensed (alternatively, unauthorized, non-licensed, license-unnecessary) band is referred to as LTE-unlicensed (LTE-U) or LAA.

Figure 13:
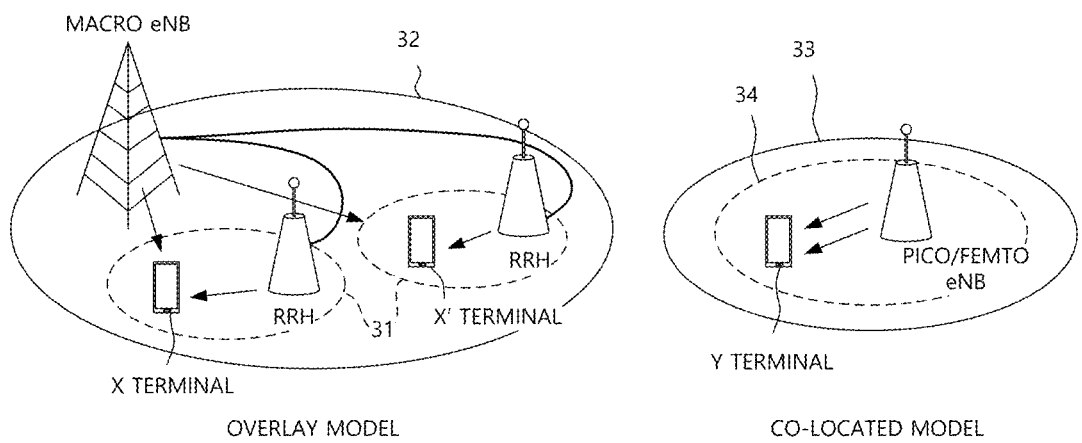
FIG. 13 illustrates a deployment scenario of a user equipment and a base station in an LAA service environment.

FIG. 13 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model and a co-located model.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LTE-U message or data and determine the LTE-U message or data as a kind of energy to perform an interference avoidance operation by an energy detection technique. That is, when energy corresponding to the LTE-U message or data is lower than−62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LTE-U technology/service. However, since peripheral equipments which perform communication through the unlicensed band attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

Figure 14:
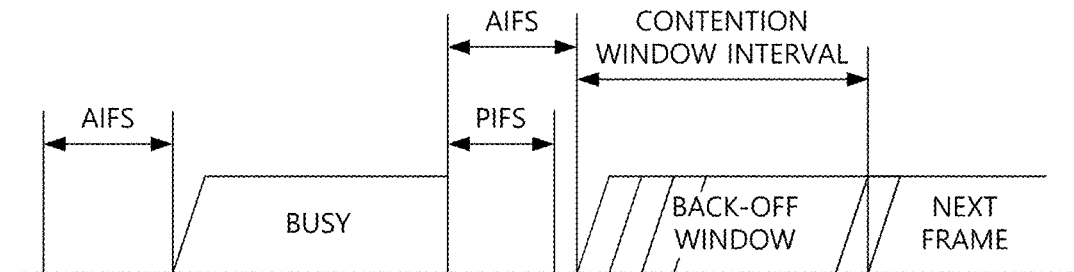
FIG. 14 illustrates a conventional communication scheme operating in an unlicensed band.

FIG. 14 illustrates a communication scheme (e.g., wireless LAN) that operates in an unlicensed band in the related art. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a back-off procedure after a defer period (e.g., arbitration interframe space (AIFS), PCF IFS (PIFS), or the like). The defer period means a minimum time when the terminal needs to wait after the channel is idle. The back-off procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
An LBT procedure by a Tx entity is not performed.
Category 2: LBT without Random Back-Off
A time interval in which the channel needs to be sensed in an idle state before the Tx entity performs a transmission on the channel is decided. The random back-off is not performed.
Category 3: LBT with Random Back-Off with a CW of Fixed Size
LBT method that performs random back-off by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

Category 4: LBT with Random Back-Off with a CW of Variable Size

LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
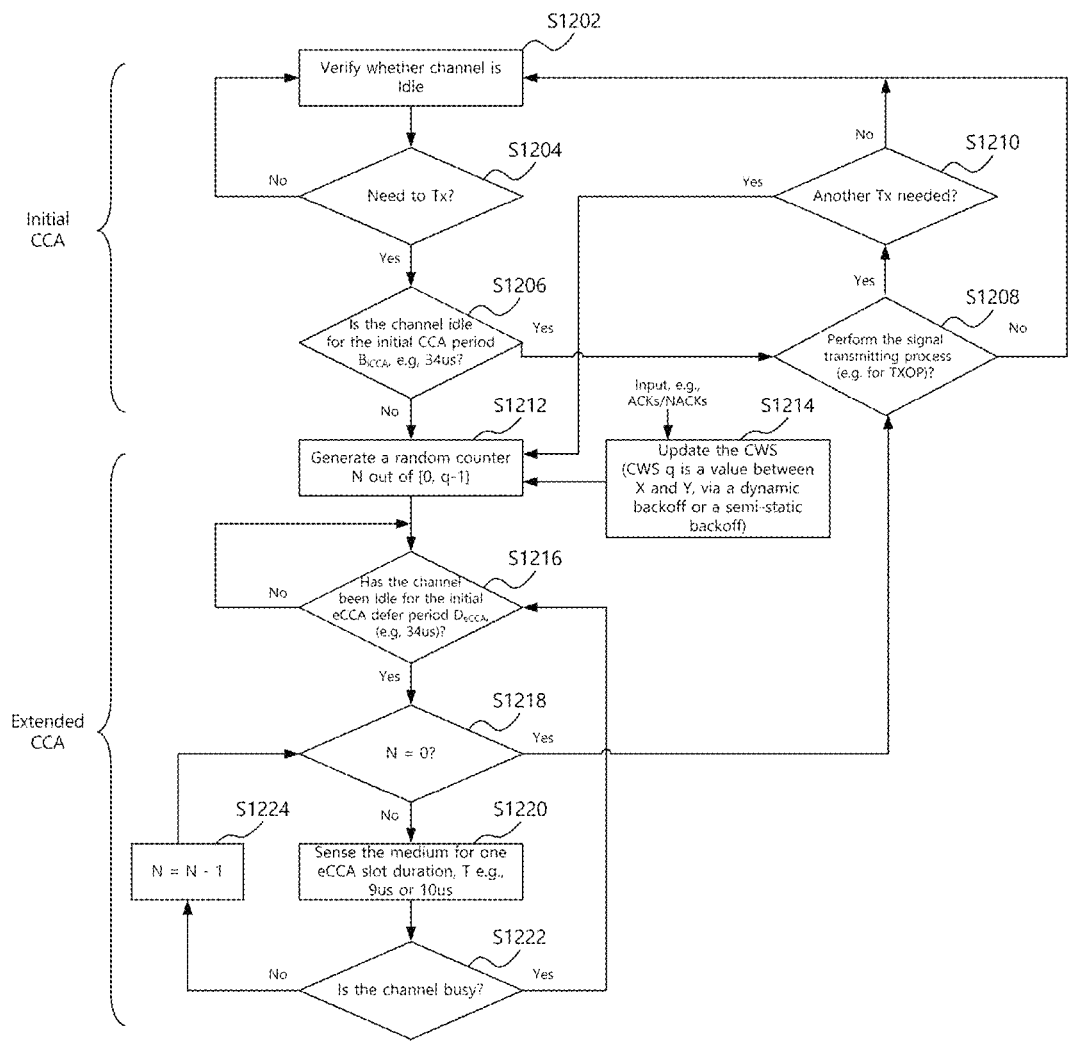
FIGS. 15 to 16 illustrate a Listen-Before-Talk (LBT) procedure for DL transmission.
Figure 16:
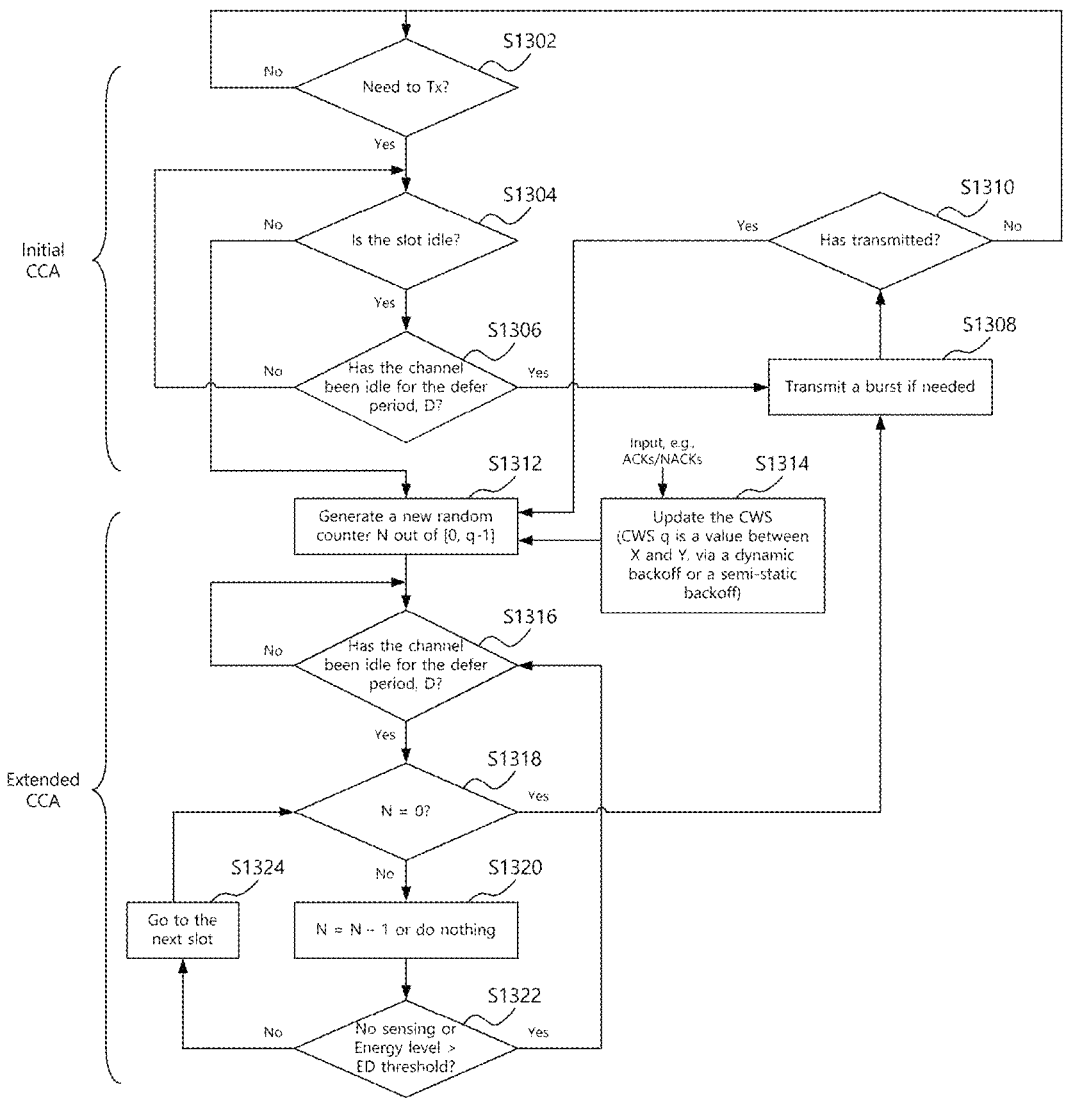

FIGS. 15 and 16 illustrate a DL transmission process based on the category 4 LBT. The category 4 LBT may be used to guarantee fair channel access with Wi-Fi. Referring to FIGS. 15 and 16, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the signal transmission is required or DL transmission is performed just before. That is, it is determined whether the channel is idle through the ICCA, and data transmission is performed after the ICCA period. If the interference signal is detected and data transmission fails, a data transmission time point may be obtained through a defer period+backoff counter after setting a random backoff counter.

Referring to FIG. 15, a signal transmitting process may be performed as follows.

Initial CCA

S1202: The base station verifies that the channel is idle.

S1204: The base station verifies whether the signal transmission is required. When the signal transmission is not required, the process returns to S202 and when the signal transmission is required, the process proceeds to S1206.

S1206: The base station verifies whether the chanel is idle for an ICCA defer period ($B_{CCA}$). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process. When the signal transmission is not performed, the process proceeds to S1202 (ICCA) and when the signal transmission is performed, the process proceeds to S1210. Even in the case where a back-off counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA

S1212: The base station generates the random number N in the CW. N is used as a counter during the back-off process and generated from [0, q-1]. The CW may be constituted by q ECCA slots and an ECCA slot size may be 9 μs or 10 μs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 μs or 10 μs and an actual sensing time may be at least 4μs.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 16 is substantially the same as/similar to the transmitting process of FIG. 15 and is different from FIG. 15 according to an implementation scheme. Therefore, detailed matters may be described with reference to contents of FIG. 15.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 15.

S1306: The base station verifies whether the channel is idle for a defer period (D). D may correspond to the ICCA defer period in FIG. 15. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the back-off counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the back-off process and generated from [0, q-1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIGS. 15. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operation not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

Figure 17:
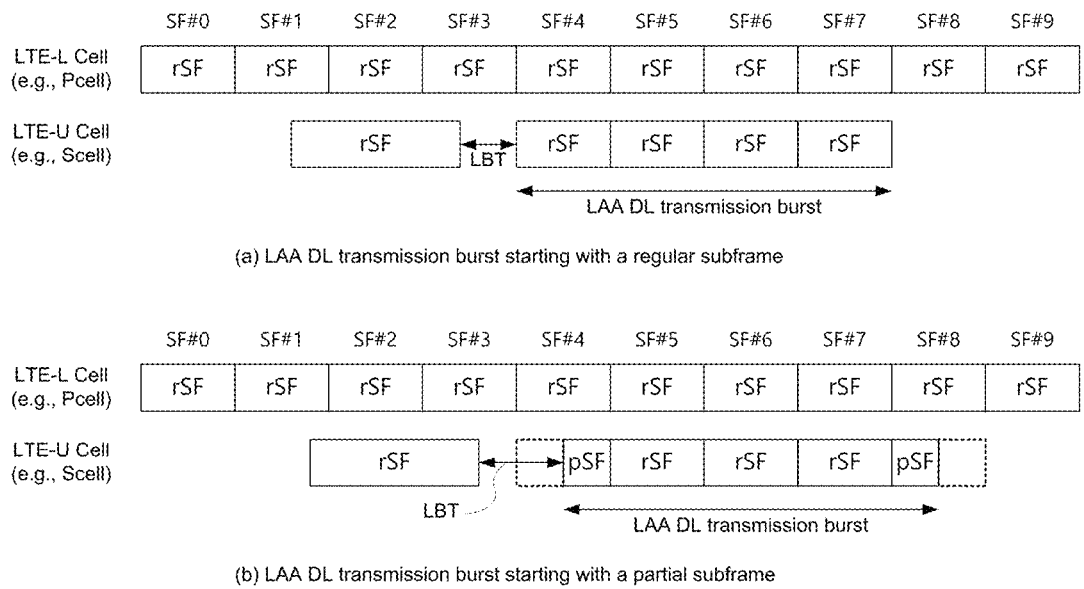
FIG. 17 illustrates DL transmission in unlicensed band.

FIG. 17 illustrates an example in which a base station performs DL transmission in an unlicensed band. The base station may aggregate cells (for convenience, LTE-L cell) of one or more licensed bands and cells (for convenience, LTE-U cell) of one or more unlicensed bands. In FIG. 17, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the DL transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The DL transmission burst may start as the regular subframe (rSF) or a partial subframe (pSF) according to an LBT situation. pSF may be a part of the subframe and may include a second slot of the subframe. Further, the DL transmission burst may end as rSF or pSF.

Hereinafter, DRS transmission in an unlicensed band will be described. Using Rel-12 DRS on carriers within the unlicensed band introduces new limitations. LBT regulation in some areas treats DRS as a short control transmission, allowing DRS transmission without LBT. However, in some areas (such as Japan), LBT is also required for short control transmissions. Therefore, it is required to apply the LBT to the DRS transmission on the LAA SCELL.

Figure 18:
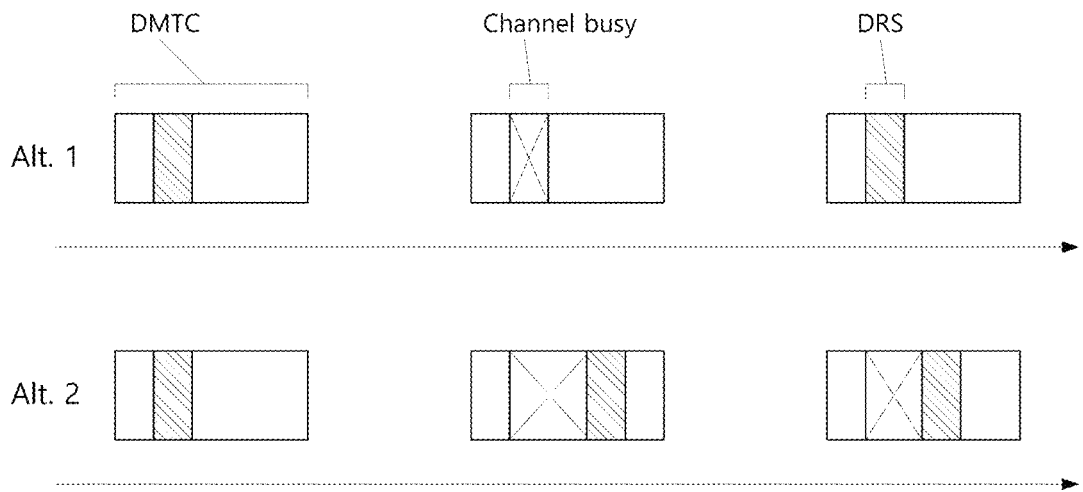
FIG. 18 illustrates DRS transmission in unlicensed band.

FIG. 18 illustrates DRS transmission in an unlicensed band. When LBT is applied to DRS transmission, DRS may not be periodically transmitted due to LBT failure in the unlicensed band, unlike Rel-12 DRS transmitted in the licensed band. If the DRS transmission fails within the DMTC, the following two options may be considered.

Alt1: The DRS may only be transmitted at a fixed time point within the DMTC. Therefore, when the DRS transmission fails, there is no DRS transmission in the DMTC.

Alt2: The DRS may be transmitted in at least one other time point within the DMTC. Thus, when a DRS transmission fails, a DRS transmission may be attempted at another time point within the DMTC.

Hereinafter, DRS transmission in an unlicensed band will be described. Specifically, a parameter for DRS transmission suitable for LAA based on DRS of 3GPP LTE Rel-12, a DRS transmission method, and the like are suggested. For convenience, DRS in the existing licensed band is referred to as Rel-12 DRS or LTE-L DRS, and DRS in the unlicensed band is referred to as LAA DRS or LTE-U DRS.

Figure 19:
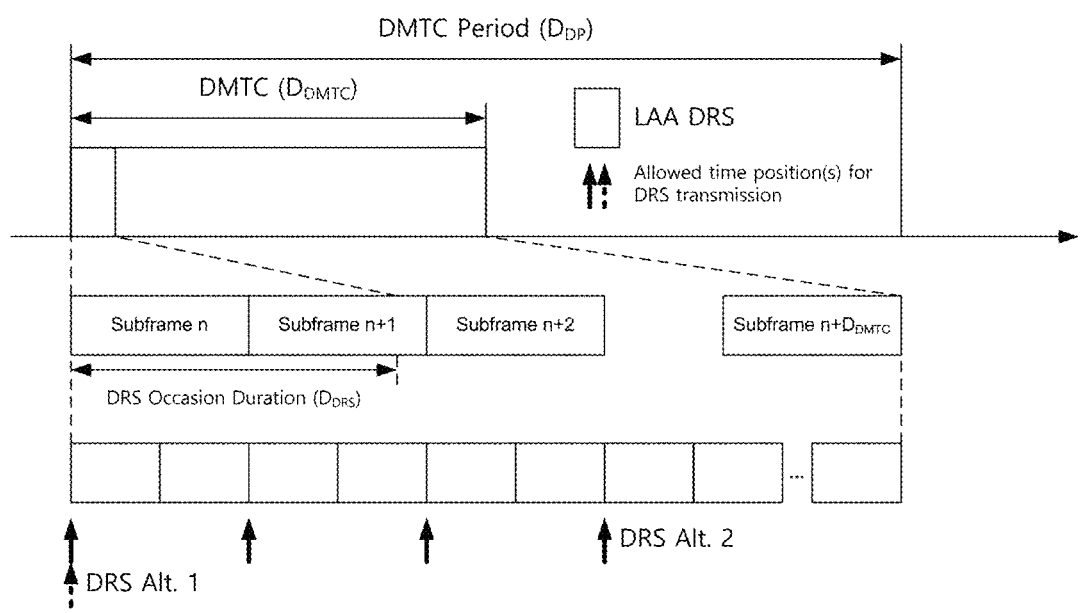
FIG. 19 illustrates a parameter for LAA DRS transmission and a DRS transmission method based on LBT.

FIG. 19 illustrates a parameter for LAA DRS transmission and a DRS transmission method based on LBT. The DRS transmission period is configured by the DMTC, and the DMTC period in the Rel-12 DRS is configured to 40/80/160 ms (see FIG. 8). However, when the channel of the transmission time point is busy due to the peripheral interference or the like in the case of the DRS transmitted in the LAA based on the LBT, the DRS may not be transmitted according to the DRS transmission period. Therefore, if the DMTC period is configured to the same as that in the LAA DRS, the transmission frequency of the LAA DRS may be lowered. Therefore, a new DMTC period is required in the LAA, and may be configured to 40 ms or less, for example. In addition, the base station may attempt to transmit DRS at least once within the DMTC period, and may configure a duration such as the DMTC and may be configured to transmit DRS in the corresponding duration. Accordingly, since the user equipment expects DRS transmission only in the DMTC, DRS search/detection is performed only in the corresponding DMTC, thereby reducing the power consumption of the user equipment and the burden of blind detection/decoding. When a DRS transmission occurs in the DMTC, the base station transmits a DRS configuration (e.g., a configuration with CRS/PSS/SSS/CSI-RS in Rel-12) when the channel is idle after LBT. DRS transmission duration may be defined as DRS occasion duration. The DRS occasion duration in Rel-12 may be configured to 1 to 5 ms. Since LAA operates based on LBT, as the DRS length (=DRS occasion duration) becomes longer, the transmittable time point decreases, and in the case of long DRS, continuous transmission is required so that idle duration does not occur in order to prevent the transmission of other base stations/terminals/Wi-Fi devices based on LBT. FIG. 19 shows a DRS occasion duration having a length of at least one subframe for convenience, but the length of the DRS occasion duration is not limited thereto. A method of transmitting DRS after LBT is broadly classified into two. There are an Alt1 (DRS Alt. 1) technique, which allows transmission from a fixed location (for convenience, the DMTC starting location) in the DMTC based on the LBT, and an Alt2 (DRS Alt. 2) technique, which allows at least one other DRS transmission even if the CCA result channel is busy in the DMTC and the DRS transmission fails.

Figure 20:
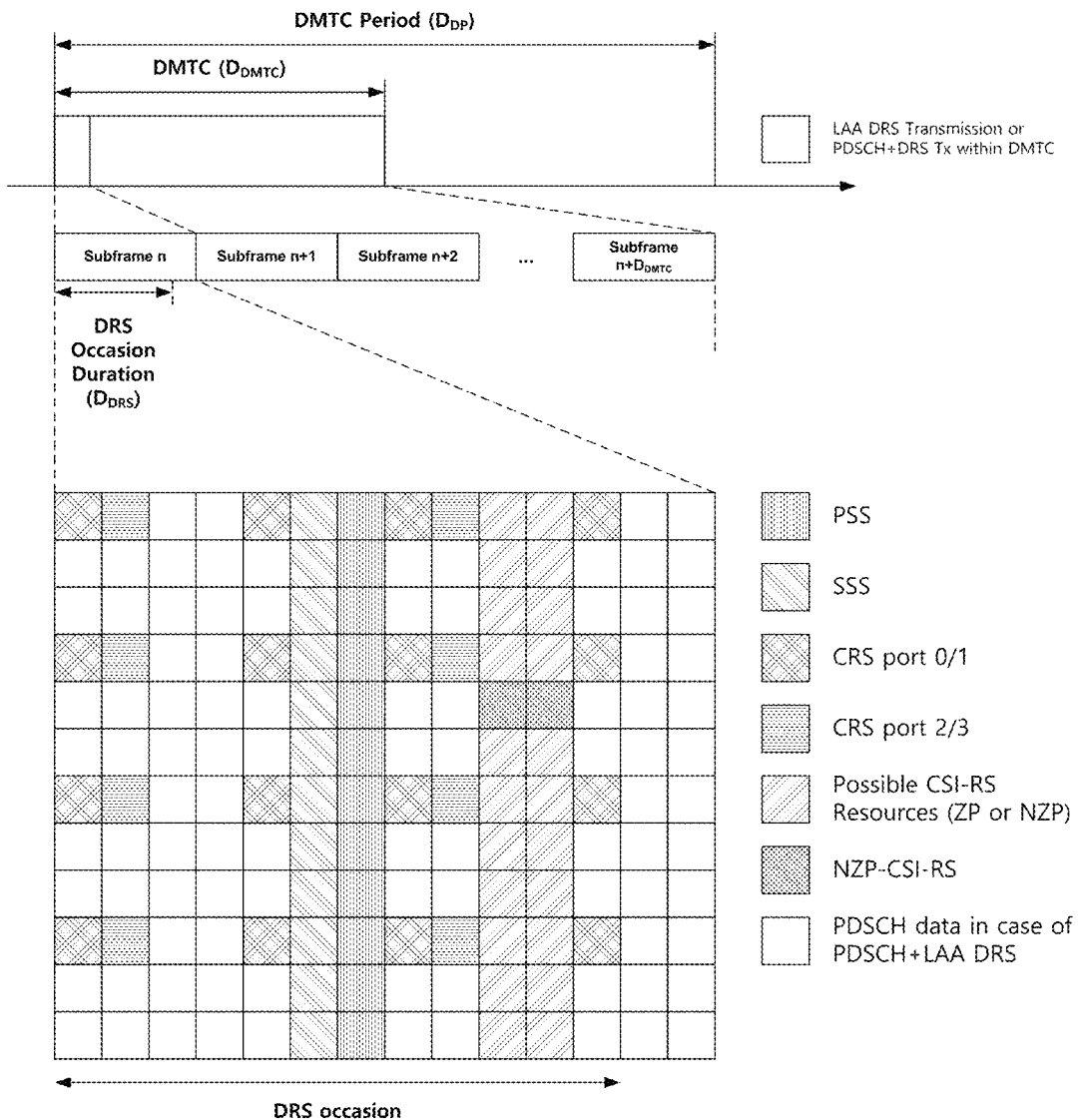
FIGS. 20 and 21 illustrate LAA DRS+PDSCH simultaneous transmission in DMTC.
Figure 21:
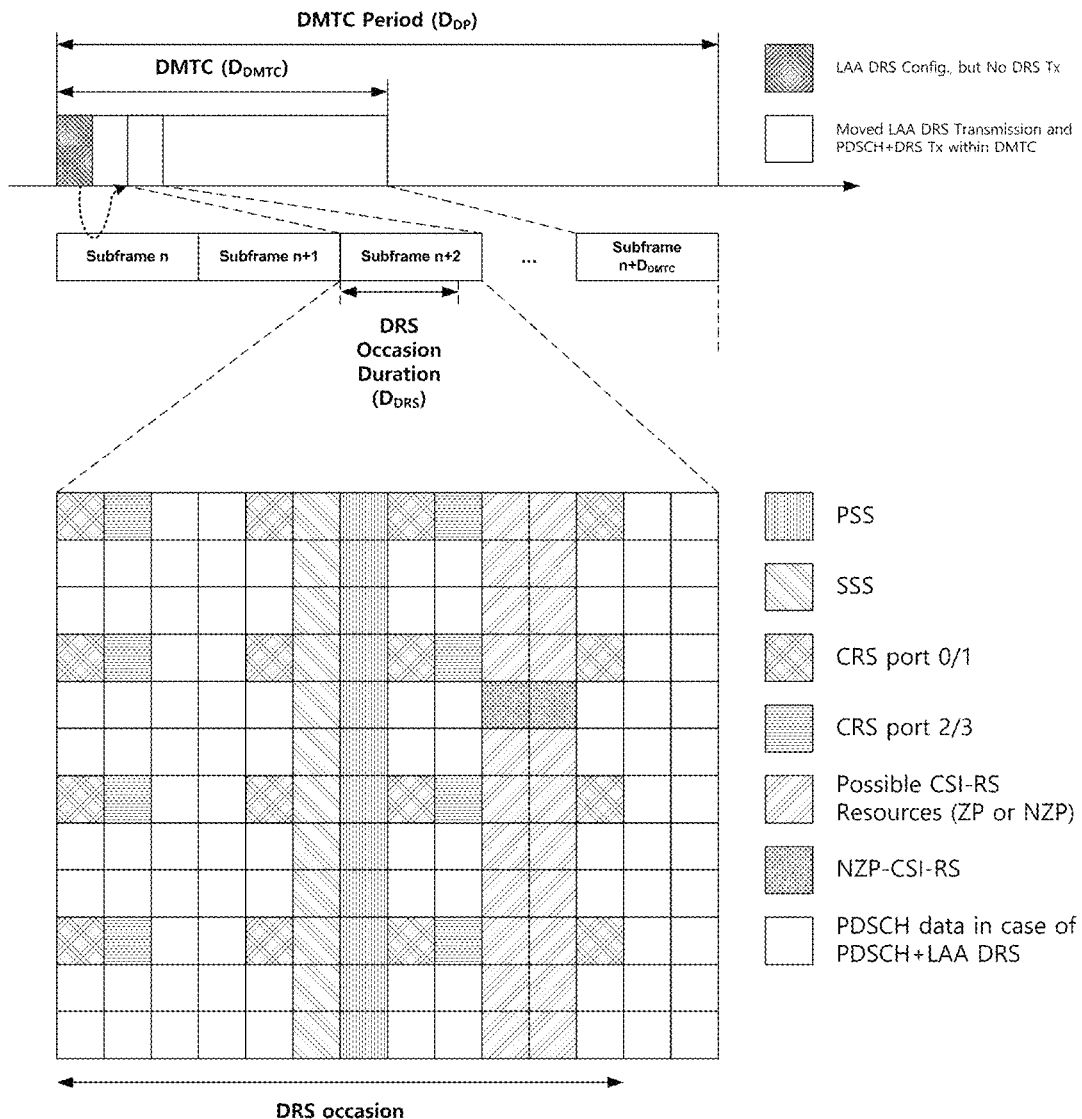

FIG. 20 illustrates a case where simultaneous transmission of LAA DRS+PDSCH occurs in SF #0/#5 in the LAA DMTC, and FIG. 21 illustrates a case where simultaneous transmission of LAA DRS+PDSCH occurs in SF except for SF #0/#5 in LAA DMTC. SF #0/#5 represents SF #0 and/or SF #5. For illustration of the invention, although the drawing illustrates only the case where simultaneous transmission of LAA DRS+PDSCH occurs, in SF in the LAA DMTC, (i) only LAA DRS transmission (DRS alone transmission), (ii) only PDSCH transmission (PDSCH alone transmission), and (iii) LAA DRS+PDSCH simultaneous transmission may be performed. When CRS/PSS/SSS/CSI-RS (CSI-RS may be used as DRS if it is configured separately for DRS) is transmitted for DRS, CRS/PSS/SSS/CSI-RS is used for the original purpose (e.g., L1 channel estimation (e.g., CSI), data demodulation, time/frequency synchronization, etc.) and RRM measurement (L3 channel estimation) and when CRS/PSS/SSS/CSI-RS is transmitted for non-DRS, CRS/PSS/SSS/CSI-RS is used for the original purpose. Therefore, when a user equipment detects CRS/PSS/SSS/CSI-RS, user equipment should recognize whether or not CRS/PSS/SSS/CSI-RS are transmitted as DRS. Also, when the PDSCH is transmitted from the SF in the LAA DMTC, the amount/location of the resource (i.e., RE) to which the PDSCH is mapped in the SF changes depending on (i) PDSCH alone transmission, or (ii) LAA DRS+PDSCH simultaneous transmission. Therefore, in order to properly decode the PDSCH, the user equipment is required to recognize whether the PDSCH is transmitted alone or with the LAA DRS in the corresponding SF.

Hereinafter, for the DL transmission in the unlicensed band, a method and operation of a base station to allow a user equipment to recognize (i) whether LAA DRS exists (and/or whether LAA DRS is transmitted alone), (ii) LAA DRS+PDSCH is transmitted simultaneously, and (iii) whether PDSCH is transmitted alone will be described. In addition, for the DL transmission in the unlicensed band, a method and operation of a user equipment to distinguish (i) whether LAA DRS exists (and/or whether LAA DRS is transmitted alone), (ii) LAA DRS+PDSCH is transmitted simultaneously, and (iii) whether PDSCH is transmitted alone will be described. Hereinafter, DRS refers to the unlicensed band DRS (e.g., LAA DRS) unless otherwise specified.

An explicit signaling method and an implicit signaling method are possible as a method of a base station to allow a user equipment to recognize whether a LAA DRS exists. First, the following explicit signaling method may be used.

Method 1) the base station may signal to the user equipment whether or not DRS is present (of the LAA cell) through L1 signaling (e.g., PDCCH (DCI), common control channel, and PHICH) in the licensed band cell (e.g., PCell). For example, using a UE-specific DCI format or a common DCI format in a PCell or a PHICH resource on a licensed band, the base station may indicate to the user equipment whether or not there is DRS of the unlicensed band cell.

First, a method of indicating whether or not DRS is present to a user equipment using a user equipment-specific DCI format will be described. In cross-carrier scheduling, using DL Grant DCI format included in PCell PDCCH/EPDCCH, the base station schedules a DL transmission burst (e.g., PDSCH) in the unlicensed band to the user equipment. Thus, by including an indication bit (e.g., indicating the presence or absence of DRS) in the DL grant DCI format that schedules the unlicensed band, the user equipment may recognize the presence of DRS in the unlicensed band through the corresponding indication bit. Through this, for the SF of the unlicensed band (or DL transmission burst), the user equipment may determine (i) whether or not DRS is present (or whether DRS is transmitted alone), (ii) whether DRS+PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/decoding process (e.g., including or except information in the DRS RE during decoding/demodulating).

Next, the base station may inform the user equipment of the presence of DRS using a common DCI. Since DRS is transmitted in a base station-specific (BS-specific) manner in order for RRM measurement or coarse/fine time/frequency synchronization, the presence or absence of DRS is informed by using a control channel having a DCI that is CRC-scrambled by CC-RNTI, i.e., a common DCI so that user equipments capable of receiving a base station signal receive it in common. Through such signaling, for the corresponding subframe, the user equipment may determine (i) whether or not DRS is present (or whether DRS is transmitted alone), (ii) whether DRS+PDSCH is transmitted simultaneously, (iii) whether PDSCH is transmitted alone.

Accordingly, the base station may perform rate-matching/ resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating).

Finally, the PHICH resource in the licensed band may be used to indicate to the user equipment whether DRS is present. For uplink transmission in the licensed band, since synchronous and non-adaptive retransmissions are supported, a PHICH resource that transmits HARQ-ACK feedback is used. On the other hand, for uplink transmission in the unlicensed band, since asynchronous and adaptive retransmissions are supported, a PHICH resource that transmits is not used. On the other hand, in the case of cross-carrier scheduling, when the existing procedure is followed, the PHICH is transmitted from the cell in which the UL grant is transmitted. Therefore, the PHICH resource for SCell (i.e., LAA SCell) in the unlicensed band is configured to be transmitted from the PCell in the licensed band. However, for the uplink transmission in the LAA SCell, retransmission is indicated only through the PDCCH, PHICH resources for LAA SCell in PCell are not used. Therefore, it is possible to indicate whether the DRS is transmitted in the LAA SCell using the PHICH resource for the LAA SCell in the PCell. Through such signaling, for the corresponding subframe, the user equipment may determine (i) whether or not DRS is present (or whether DRS is transmitted alone), (ii) whether DRS+PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating).

Method 2) the base station may signal to the base station whether or not DRS is present through L1 signaling (e.g., PDCCH (DCI), common control channel, and PHICH) in the unlicensed band cell (e.g., LAA SCell). For example, using a UE-specific DCI format or a common DCI format in a LAA SCell or a PHICH resource, the base station may indicate to the user equipment whether or not DRS is present.

First, a method of indicating whether or not DRS is present to a user equipment using a user equipment-specific DCI format will be described. When self-carrier scheduling is used, the base station includes an indication bit (e.g., indicating the presence or absence of DRS) in the DL grant DCI format of the PDCCH transmitted in the unlicensed band, so that the user equipment may recognize the presence of DRS in the unlicensed band through the corresponding indication bit. Through this, for the SF of the unlicensed band (or DL transmission burst), the user equipment may determine (i) whether or not DRS is present (or whether DRS is transmitted alone), (ii) whether DRS+PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating). When SCell (LAA SCell #1) in the unlicensed band cross-carriers schedules another SCell (LAA SCell #2) in the unlicensed band, the base station schedules a DL transmission burst (e.g., PDSCH) of LAA SCell #2 to the user equipment using the DL Grant DCI format included in the PDCCH/EPDCCH of LAA SCell #1. Thus, by the DL grant DCI format of the LAA SCell #1 including an indication bit (e.g., indicating the presence or absence of DRS) in, the user equipment may recognize the presence of DRS in the LAA SCell #2 through the corresponding indication bit. Through this, for the SF of the LAA SCell #2 (or DL transmission burst), the user equipment may determine (i) whether or not DRS is present (or whether DRS is transmitted alone), (ii) whether DRS+PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating).

Next, the base station may inform the user equipment of the presence of DRS using a common DCI on the LAA SCell. Since DRS is transmitted in a BS-specific manner in order for RRM measurement or coarse/fine time/frequency synchronization, the presence or absence of DRS may be informed by using a control channel having a DCI that is CRC-scrambled by CC-RNTI on the LAA SCell, i.e., a common DCI so that user equipments capable of receiving a base station signal to receive it in common. Through such signaling, for the corresponding subframe, the user equipment may determine (i) whether or not DRS is present (or whether DRS is transmitted alone), (ii) whether DRS+PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating).

Finally, the PHICH resource in the unlicensed band may be used to indicate to the user equipment whether DRS is present. For uplink transmission in the licensed band, since synchronous and non-adaptive retransmissions are supported, a PHICH resource that transmits HARQ-ACK feedback is used. On the other hand, for uplink transmission in the licensed band, since asynchronous and adaptive retransmissions are supported, a PHICH resource is not used. On the other hand, in the case of cross-carrier scheduling, when the existing procedure is followed, the PHICH is transmitted from the cell in which the UL grant is transmitted. Therefore, the PHICH resource for the scheduled SCell in the unlicensed band is configured in the scheduling SCell in the unlicensed band. Therefore, it is possible to indicate the DRS transmission in the scheduled SCell using the PHICH resource for the scheduled SCell in the scheduling SCell. Through such signaling, for the corresponding subframe, the user equipment may determine (i) whether or not DRS is present (or whether DRS is transmitted alone), (ii) whether DRS+PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating). Also, in the case of the self-carrier scheduling, when the existing procedure is followed, the PHICH resource for the uplink transmission scheduled from the unlicensed band cell (e.g., LAA SCell #1) is configured on the LAA SCell #1. Therefore, it is possible to indicate the DRS transmission for the LAA SCell #1 using the PHICH resource on the LAA SCell #1. Through such signaling, for the corresponding subframe, the user equipment may determine (i) whether or not DRS is present (or whether DRS is transmitted alone), (ii) whether DRS+ PDSCH is transmitted simultaneously, (iii) whether PDSCH is transmitted alone. Accordingly, the base station may perform rate-matching/resource mapping in consideration of the presence or absence of DRS when transmitting EPDCCH/PDSCH. Also, in consideration of the presence of DRS, as assuming base station rate-matching/resource mapping according to the presence of DRS, user equipment may also perform an EPDCCH/PDSCH decoding/demodulating process (e.g., including or except information on the DRS RE during decoding/demodulating).

Also, using the implicit signaling method below, the base station may make the user equipment aware of the presence of DRS that may be transmitted in the unlicensed band.

Method 3) In the DMTC, regardless of whether the DRS is transmitted from the base station, the user equipment may consider/assume that DRS is always/may be present in the SF where DRS transmission is possible. Specifically, the user equipment in the DMTC configured to the user equipment may assume that PDSCH and the DRS are simultaneously transmitted and assumes the presence of DRS to perform rate-matching for EPDCCH/PDSCH. That is, DRS RE may always be considered in decoding/demodulating EPDCCH/PDSCH in DMTC (i.e., rate-matching is performed considering DRS RE). Therefore, the user equipment does not need to receive signaling on whether DRS is transmitted. However, when the user equipment performs DRS detection, e.g., SF including CRS/PSS/SSS/CSI-RS (CSI-RS may be used as DRS if it is separately configured for DRS) detection once in the DMTC, the user equipment assumes that a DRS transmission from the base station occurs in the SF, so that the user equipment does not need to consider the DRS RE during decoding/demodulation of the EPDCCH/PDSCH after the DRS detection in the corresponding DMTC (i.e., rate-matching is not performed in consideration of DRS RE). When the LBT is successful, since the DRS transmission from the base station is performed only once within the DMTC, when the user equipment detects DRS in the DMTC, it is not necessary to consider the DRS presence for the EPDCCH/PDSCH transmission of the remaining DL transmission bursts transmitted by the base station. Accordingly, when the user equipment performs DRS detection, e.g., SF including CRS/PSS/SSS/ CSI-RS (CSI-RS may be used as DRS if it is separately configured for DRS) detection once in the DMTC, the user equipment assumes that a DRS transmission from the base station occurs in the SF, so that the user equipment does not need to consider the DRS RE during decoding/demodulation of the EPDCCH/PDSCH after DRS detection in the corresponding DMTC (i.e., does not perform rate-matching in consideration of DRS RE). However, when DRS detection, e.g., SF including CRS/PSS/SSS/CSI-RS (CSI-RS may be used as DRS if it is separately configured for DRS) detection is not yet performed in the DMTC, the user equipment assumes the DRS presence in the SF where DRS transmission possibility exists and performs rate-matching on EPDCCH/PDSCH according to DRS RE mapping to perform decoding/demodulation of EPDCCH/PDSCH.

Figure 22:
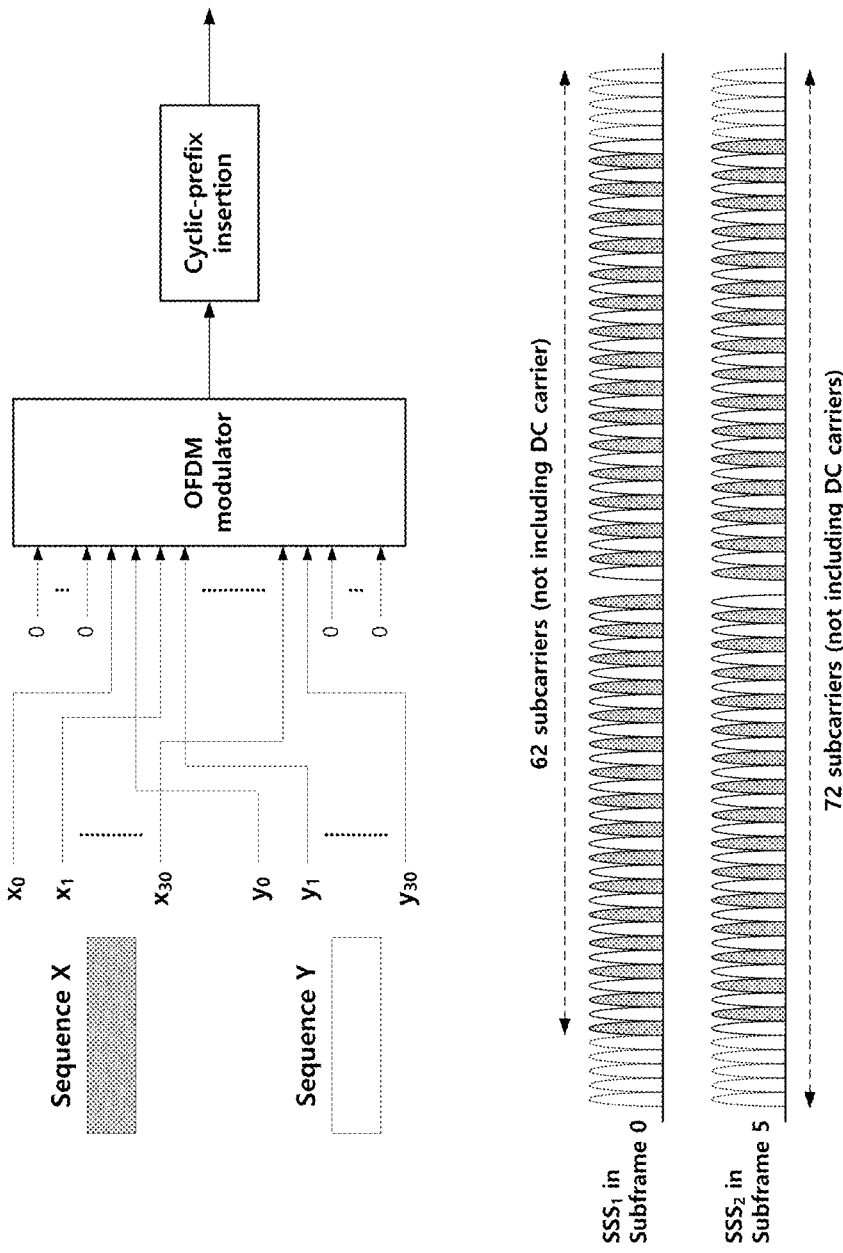
FIG. 22 illustrates an existing Secondary Synchronization Signal (SSS).

Before describing method 4), a secondary synchronization signal (SSS) sequence index according to a subframe index used in 3GPP Rel-8 to Rel-12 will be described with reference to FIG. 22. Referring to FIG. 22, the SSS sequence is composed of an SSS sequence 1 $SSS_1$ allocated to SF #0 and an SSS sequence 2 $SSS_2$ allocated to SF #0. $SSS_1$ and $SSS_2$ are both composed of sequences X and Y, respectively. The sequences X and Y are alternately mapped to subcarriers. In SF #0, the sequence X is mapped first, and in SF #5, the sequence Y is mapped first. That is, the SSS is composed of a combination of the sequences X and Y, and the mapping order of the sequences X and Y is changed according to the SF index. For convenience, it is assumed that $SSS_1$ is composed of (sequence X, sequence Y), and $SSS_1$ is composed of (sequence Y, sequence X). It is also assumed that $SSS_1$ and $SSS_2$ have SSS sequence index 1 and SSS sequence index 2, respectively.

Method 4) through the detection of the index of the SSS constituting the DRS, the user equipment may recognize whether it is the DRS transmission or the DRS+PDSCH simultaneous transmission. First, a method of configuring a sequence index of SSS/CRS/CSI-RS (CSI-RS may be used as DRS when it is separately configured for DRS) constituting DRS will be described (Option 1 to 4).

Option 1) when DRS is transmitted in SF #0 to #4 in DMTC, the SSS/CRS/CSI-RS sequence in the DRS may be obtained by applying the index of SF #0 to the 3GPP Rel-12 SSS/CRS/CSI-RS sequence. When DRS is transmitted in SF #5 to #9 in DMTC, SSS/CRS/CSI-RS sequence in the DRS may be obtained by applying the index of SF #5 to 3GPP Rel-12SSS/CRS/CSI-RS sequence. Specifically, the 3GPP Rel-12 SSS/CRS/CSI-RS sequence is provided based on the SF index of each SF. The SSS/CRS/CSI-RS sequence in DRS is provided based on the index of SF #0 or SF #5.

As an example, the 3GPP Rel-12 CRS sequence is generated by Equation 1. The initial value of the CRS sequence is given by Equation 2.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{max,DL} - 1$$

Here, $n_s$ represents a slot index in a radio frame, l represents an OFDMA symbol index in the slot, $c(\bullet)$ represents a pseudo-random sequence, and $N_{RB}^{max,DL}$ represents the maximum number of RBs in the DL band. $c(\bullet)$ is initialized using the initial value of Equation 2 at the beginning of each OFDM symbol.

$$c_{init} = 2^{10} \cdot (7 \cdot (n_s+1)+l+1) \cdot (2 \cdot N_{ID}^{cell}+1) + 2 \cdot N_{ID}^{cell} + N_{CP} \quad \text{[Equation 2]}$$

Here, $n_s$ represents a slot index in a radio frame, l represents an OFDM symbol index in the slot, $N_{ID}^{cell}$ represents a physical cell ID, $N_{CP}$ represents a CP type, 1 for a normal CP and 0 for an extended CP. The slot index $n_s$ in the radio frame has the following relationship with the SF index SF #.

TABLE 2

| | SF # | | | | | | | | | |
|---|---|---|---|---|---|---|---|---|---|---|
| | 0 | 1 | 2 | 3 | 4 | 5 | 6 | 7 | 8 | 9 |
| $n_s$ | 0  1 | 2  3 | 4  5 | 6  7 | 8  9 | 10  11 | 12  13 | 14  15 | 16  17 | 18  19 |

Since the initial value is determined based on each SF index in the 3GPP Rel-12 CRS sequence, $n_s$ of Equation 2 has a value of 0 to 19 according to the SF to which the CRS is transmitted.

On the other hand, when the CRS is used as the DRS, $n_s$ of Equation 2 has only a slot index corresponding to the SF #0 or SF #5 according to the SF to which the DRS is transmitted as follows.

TABLE 3

| | SF # | | | | | | | | | |
|---|---|---|---|---|---|---|---|---|---|---|
| | 0 | 1 | 2 | 3 | 4 | 5 | 6 | 7 | 8 | 9 |
| $n_s$ | 0  1 | 0  1 | 0  1 | 0  1 | 0  1 | 10  11 | 10  11 | 10  11 | 10  11 | 10  11 |

As an example, the 3GPP Rel-12 CSI-RS sequence is generated by Equation 3. The initial value of the CSI-RS sequence is given by Equation 4.

$$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1, \ldots, N_{RB}^{max,DL} - 1$$
[Equation 3]

Here, $n_s$ represents a slot index in a radio frame, l represents an OFDMA symbol index in the slot, c(•) represents a pseudo-random sequence, and $N_{RB}^{max,DL}$ represents the maximum number of RBs in the DL band. c(•) is initialized using the initial value of Equation 4 at the beginning of each OFDM symbol.

$$c_{init} = 2^{10}\cdot(7\cdot(n_s+1)+l+1)\cdot(2\cdot N_{ID}^{CSI}+1)+2\cdot N_{ID}^{CSI}+N_{CP}$$
[Equation 4]

Here, $n_s$ represents a slot index in a radio frame, l represents an OFDM symbol index in a slot, $N_{ID}^{CSI}$ is configured by a higher layer (e.g., RRC), and is equal to $N_{ID}^{cell}$ when not configured by a higher layer. $N_{ID}^{cell}$ represents a physical cell ID, and $N_{CP}$ represents a CP type, 1 for a normal CP and 0 for an extended CP. The slot index $n_s$ in the radio frame has the relationship with the SF index SF #as in Table 2.

Moreover, in the case where the CSI-RS is configured as DRS, the slot indexes $n_s$ shown in Table 3 may be applied to Equation 3 and Equation 4 for CSI-RS sequence generation in the same manner as applied in CRS used as DRS. That is, when the CSI-RS is used as the DRS, $n_s$ of Equation 4 has only a slot index corresponding to the SF #0 or SF #5 according to the SF to which the DRS is transmitted as in Table 3.

Option 2) when DRS is transmitted in SF #0 to #4 in DMTC, the SSS sequence in the DRS may be obtained by applying the index of SF #0 to the 3GPP Rel-12 SSS sequence (e.g., $SSS_1$ of FIG. 22). When DRS is transmitted in SF #5 to #9 in DMTC, the SSS sequence in the DRS may be obtained by applying the index of SF #5 to the 3GPP Rel-12555 sequence (e.g., $SSS_2$ of FIG. 22). On the other hand, the CRS/CSI-RS sequence in the DRS may use the CRS/CSI-RS sequence generated according to each SF index as in the method used in 3GPP Rel-12. That is, for the CRS as the DRS, the slot index $n_s$ of Table 2 may be applied to Equation 2 according to the transmitted SF, and for the CSI-RS of the DRS, the slot index $n_s$ of Table 2 may be applied to Equation 4 according to the transmitted SF.

Option 3) when DRS is transmitted in DMTC, the SSS/CRS/CSI-RS sequence in the DRS may be obtained by applying the index of SF #0 to the 3GPP Rel-12 SSS/CRS/CSI-RS sequence. That is, unlike Option 1, when DRS is transmitted in DMTC, the SSS/CRS/CSI-RS sequence in the DRS may be obtained by always applying the index of SF #0 to the 3GPP Rel-12 SSS/CRS/CSI-RS sequence. That is, for the CRS as the DRS, the slot index $n_s$ of Table 4 may be applied to Equation 2 according to the transmitted SF, and for the CSI-RS of the DRS, the slot index $n_s$ of Table 4 may be applied to Equation 4 according to the transmitted SF.

TABLE 4

| | SF # | | | | | | | | | |
|---|---|---|---|---|---|---|---|---|---|---|
| | 0 | 1 | 2 | 3 | 4 | 5 | 6 | 7 | 8 | 9 |
| $n_s$ | 0  1 | 0  1 | 0  1 | 0  1 | 0  1 | 0  1 | 0  1 | 0  1 | 0  1 | 0  1 |

Option 4) when DRS is transmitted in DMTC, the SSS sequence in the DRS may be obtained by applying the index of SF #0 to the 3GPP Rel-12 SSS sequence. On the other hand, use the CRS/CSI-RS sequence in the DRS may use the CRS/CSI-RS sequence generated according to each SF index as in the method used in 3GPP Rel-12. That is, for the CRS as the DRS, the slot index $n_s$ of Table 2 may be applied to Equation 2 according to the transmitted SF, and for the CSI-RS as the DRS, the slot index $n_s$ of Table 2 may be applied to Equation 4 according to the transmitted SF.

Options 1) to 4) may be considered in DRS transmission irrespective of PDSCH transmission. In order to distinguish between (i) whether or not DRS is present (or whether DRS is transmitted alone) and (ii) DRS+PDSCH simultaneous transmission, for example, method 4) may swap the SSS sequence index to use an index different from the SSS sequence index used for DRS during DRS+PDSCH simultaneous transmission. Accordingly, after detecting the SSS sequence index, the user equipment may recognize whether the DRS transmission is performed or the DRS+PDSCH simultaneous transmission is performed in the DL transmission burst in the corresponding SF. Accordingly, through different SSS sequence index transmissions at the base station and detection at the user equipment, for the SF (or DL transmission burst), the user equipment may determine (i) whether or not DRS is present (and/or whether DRS is transmitted alone), (ii) whether DRS+PDSCH is transmitted simultaneously, (iii) whether PDSCH is transmitted alone. Accordingly, the user equipment may perform rate-matching for the PDSCH to perform decoding/demodulation of the EPDCCH/PDSCH.

An example in which method 4 is applied to Option 1) will be described. When DRS is transmitted in SF #0 to SF #4 in the DMTC, the SSS/CRS/CSI-RS sequence in DRS may be obtained by applying the index of SF #0 to the 3GPP Rel-12SSS/CRS/CSI-RS sequence, and when DRS is transmitted in SF #5 to #9 in the DMTC, the SSS/CRS/CSI-RS sequence in DRS may be obtained by applying the index of SF #5 to the 3GPP Rel-12SSS/CRS/CSI-RS sequence. However, when DRS+PDSCH simultaneous transmission is performed in the DMTC, the SSS sequence index used in SF #5 instead of SF #0 is applied to the SSS sequences of SF #0 to #4 (e.g., $SSS_2$ in FIG. 22) and the SSS sequence index used in SF #0 instead of SF #5 may be applied to the SSS sequences of SF #5 to #9 (e.g., $SSS_1$ in FIG. 22). Accordingly, through SSS detection, for the SF (or, DL transmission burst), the user equipment may know whether (i) DRS transmission is performed or (ii) DRS+PDSCH simultaneous transmission is performed.

An example in which method 4 is applied to Option 2) will be described. When DRS is transmitted alone in SF #0 to #9 in DMTC, the SSS sequence in the DRS may be obtained by applying the index of SF #0 to the 3GPP Rel-12 SSS (e.g., $SSS_1$ of FIG. 22). On the other hand, when DRS+PDSCH simultaneous transmission is performed in SF #0 to #4 in DMTC, the SSS sequence in the DRS may be obtained by applying the index of SF #5 to the 3GPP Rel-12 SSS (e.g., $SSS_2$ of FIG. 22). Accordingly, through SSS detection, for the SF (or, DL transmission burst), the user equipment may recognize whether (i) DRS transmission is performed or (ii) DRS+PDSCH simultaneous transmission is performed. When DRS is transmitted alone in SF #5 to #9 in DMTC, the SSS sequence in the DRS may be obtained by applying the index of SF #5 to the 3GPP Rel-12555 sequence (e.g., $SSS_2$ of FIG. 22). On the other hand, when DRS+PDSCH simultaneous transmission is performed in SF #5 to #9 in DMTC, the SSS sequence in the DRS may be obtained by applying the index of SF #0 to the 3GPP Rel-12 SSS (e.g., $SSS_1$ of FIG. 22). Accordingly, through SSS detection, for the SF (or, DL transmission burst), the user equipment may recognize whether (i) DRS transmission is performed or (ii) DRS+PDSCH simultaneous transmission is performed.

An example in which method 4 is applied to Option 3) will be described. When DRS is transmitted in DMTC, the SSS/CRS/CSI-RS sequence in the DRS may be obtained by applying the index of SF #0 to the 3GPP Rel-12 SSS/CRS/CSI-RS sequence. On the other hand, when DRS+PDSCH simultaneous transmission is performed in DMTC, the SSS sequence in the DRS may be obtained by applying the index of SF #5 to the 3GPP Rel-12 SSS (e.g., $SSS_2$ of FIG. 22). Accordingly, through SSS detection, for the SF (or, DL transmission burst), the user equipment may know whether (i) DRS transmission is performed or (ii) DRS+PDSCH simultaneous transmission is performed.

An example in which method 4 is applied to Option 4) will be described. When DRS is transmitted in DMTC, the SSS sequence in the DRS may be obtained by applying the index of SF #0 to the 3GPP Rel-12 SSS sequence (e.g., $SSS_1$ of FIG. 22). On the other hand, when DRS+PDSCH simultaneous transmission is performed in DMTC, the SSS sequence in the DRS may be obtained by applying the index of SF #5 to the 3GPP Rel-12555 (e.g., $SSS_2$ of FIG. 22). Accordingly, through SSS detection, for the SF (or, DL transmission burst), the user equipment may know whether (i) DRS transmission is performed or (ii) DRS+PDSCH simultaneous transmission is performed.

Method 5) the user equipment may implicitly detect the presence of DRS by blind detection of CRS. For example, in SF #0 /#5, a method of allowing a user equipment to implicitly recognize whether a DRS is present through blind detection of a CRS may be considered. However, in the case where DRS is transmitted in SF except for SF #0 /#5, in order to verify whether or not DRS is present, detection of the CRS sequence given by the SF index is further required (e.g., option 1). The number of blind detections of CRS may increase according to the configuration between an SF index and a CRS sequence belonging to DRS, but there are advantages that in addition to not requiring additional signaling, whether DL transmission data burst is transmitted or not may be recognized by the blind detection of CRS.

Next, the PDSCH detection operation of the user equipment for the PDSCH transmission based on the EPDCCH will be described. As considering a case where the DRS and the PDSCH are multiplexed in the SF #0/#5 in the DMTC, in the SF #0 /#5, the user equipment may perform rate-matching in consideration of DRS REs during decoding/demodulation of the PDSCH. As considering a case where DRS and EPDCCH/PDSCH are multiplexed in SF #0/#5 in the DMTC, for the EPDCCH configure to be transmitted in the PDSCH region, it is not possible to signal the presence of DRS through L1-signaling (e.g., DCI) over EPDCCH. That is, in the transmission method/transmission mode for performing the EPDCCH-based PDSCH scheduling to the user equipment, when signaling for the presence or absence of DRS through L1-signaling, this is because EPDCCH decoding must be performed before knowing whether or not DRS is present. Thus, during EPDCCH decoding/demodulation, the user equipment may perform rate-matching by always considering REs in which DRS may exist regardless of whether or not DRS is present. On the other hand, during PDSCH decoding/demodulation, the user equipment may perform rate-matching by selectively considering DRS REs according to whether or not DRS is present based on L1-signaling.

On the other hand, the transmission (e.g., (i) DRS alone transmission, (ii) DRS+PDSCH simultaneous transmission, (iii) PDSCH alone transmission) (see FIG. 20) of the base station in SF #0/#5 in DMTC may be different from the detection of the user equipment therefor. In addition, the transmission (e.g., (i) DRS alone transmission, (ii) DRS+PDSCH simultaneous transmission, (iii) PDSCH alone transmission) (see FIG. 21) of the base station in SF except SF #0/#5 in DMTC may be different from the detection of the user equipment therefor. The solution to this problem is described below.

First, under the assumption of methods for enabling the user equipment to recognize the presence of the DRS presented in the present invention, as shown in FIG. 20, the transmission (e.g., (i) DRS alone transmission, (ii) DRS+PDSCH simultaneous transmission, (iii) PDSCH alone transmission) of the base station in SF #0/#5 in DMTC is described. When an indication is received that DRS is present in SF #0 /#5, since PDSCH transmission may occur simultaneously with DRS in the DL transmission burst of SF #0 /#5, the user equipment may be required to determine whether DRS transmission only occurs in the DL transmission burst of SF #0 /#5, or DRS+PDSCH simultaneous transmission occurs. This determination may be made as the user equipment blind-decodes the PDCCH/EPDCCH. As a result of PDCCH/EPDCCH blind decoding, when there is a DL grant transmitted to the user equipment, the user equipment may perform rate-matching on the DRS RE in considering that DRS+PDSCH simultaneous transmission is performed from the base station to perform decoding/demodulation of the PDSCH. On the other hand, as a result of the PDCCH/EPDCCH blind decoding, when there is no DL grant transmitted to the user equipment, the user equipment may determine that DRS alone transmission is performed and perform DRS detection. Also, since there is no DRS in the DL transmission burst of SF #0 /#5, when there is a DL grant transmitted to the corresponding user equipment as a result of PDCCH/EPDCCH blind decoding, a user equipment receiving an indication that there is no DRS in SF #0/#5 may perform decoding/demodulation of the PDSCH without operation like rate-matching for DRS RE.

In addition, a detection method of a user equipment for the transmission (e.g., (i) DRS alone transmission, (ii) DRS+PDSCH simultaneous transmission, (iii) PDSCH alone transmission) (see FIG. 21) of the base station in SF except SF #0/#5 is described. A user equipment that receives an indication that DRS is present in SF except SF #0/#5 may first discriminate whether a DRS alone transmission is performed through blind detection of CRS in SF except SF #0/#5 (e.g., option 1). Since DRS and PDSCH transmission may occur simultaneously in the DL transmission burst in SF except SF #0 /#5, the user equipment may blind-decode the PDCCH, in SF except SF #0 /#5, to rate-match the DRS RE to perform decoding/demodulation of the PDSCH when there is a DL grant transmitted to the user equipment. Otherwise, the user equipment blind-decode the PDCCH to determine DRS alone transmission and perform DRS detection when there is no DL grant transmitted to the user equipment. Also, since DRS is not present in the DL transmission burst of the corresponding SF, when there is a DL grant transmitted to the corresponding user equipment as a result of PDCCH/EPDCCH blind decoding, a user equipment receiving an indication that DRS is not present in SF except SF #0/#5 may perform decoding/demodulation of the PDSCH without operation like rate-matching for DRS RE.

During LAA operation, when the base station is configured to perform downlink transmission on the LAA SCell after the LBT success, the user equipment receives the subframe configuration information through common control signaling transmitted from the base station on the LAA SCell and performs reception of physical channels and signals in the corresponding subframe. Here, the common control signaling includes a PDCCH with a user equipment-common DCI, for example, a PDCCH with a DCI that is CRC-scrambled by a Common Control RNTI (CC-RNTI).

Table 5 shows subframe configuration information (subframe configuration for LAA) in common control signaling. The subframe configuration information represents the occupied OFDM symbol configuration/number of the current subframe and the next subframe. The OFDM symbols occupied in the subframe are used for transmission of DL physical channels and/or physical signals.

TABLE 5

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

When the user equipment detects a PDCCH having a DCI CRC scrambled with CC-RNTI in SF #(n−1) or SF #n of the LAA SCell, the corresponding user equipment assumes the number of OFDM symbols occupied in the SF #n of the LAA SCell according to the subframe configuration information in the DCI detected in SF #(n−1) or SF #n. When the configuration of the OFDM symbol occupied for SF #n is indicated by the subframe configuration information of SF #(n−1) and SF #n, the user equipment may assume that the subframe configuration information of SF #(n−1) and SF #n indicates the same information.

On the other hand, conventionally, common control signaling is not detected in SF #(n−1) and common control signaling is detected in SF #n. When the number of occupied OFDM symbols of SF #n indicated by the common control signaling of SF #n (i.e., the LAA subframe structure) is smaller than 14, the user equipment does not (or does not need to) perform the reception of the physical channels/signals of the SF #n. From the viewpoint of receiving downlink data (e.g., PDSCH), even if the user equipment does not perform/assume PDSCH reception due to mismatch of the common control signal, HARQ retransmissions do not cause significant deterioration in system performance. The same is for a control channel (e.g., a PDCCH with DL grant DCI) that schedules downlink data (e.g., PDSCH). However, from the viewpoint of RRM measurement and time/frequency synchronization occurring periodically or aperiodically, if the user equipment does not perform RRM measurement and time/frequency synchronization due to mismatch of the common control signal, a great deterioration in system performance may occur.

To solve this problem, a method in which a user equipment performs RRM measurement and time/frequency synchronization according to reception/detection of common control signaling and LAA subframe configuration information is described. This example may be applied when the DL transmission is configured to be performed in the LAA SCell after the LBT.

First, DRS transmission for RRM measurement will be described. When DL transmission is configured to be performed in the LAA SCell after LBT, the user equipment may not detect common control signaling (e.g., indicating the configuration of the ending partial SF) in the SF #(n−1) of the LAA SCell and may detect common control signaling only in the SF #n of the LAA SCell. Here, the Ending SF indicates SF #n based on the common control signaling of SF #(n−1). Accordingly, the configuration of SF #n is limited to partial SF (i.e., the number of OFDM symbols is less than 14). In this case, when SF #n is included in the DMTC of the user equipment, the user equipment may perform DRS detection on the assumption that DRS is transmitted in SF #n, and perform RRM measurement according to the DRS detection result. Here, the DRS signal may include at least one of PSS, SSS, CRS, and CSI-RS (see FIGS. 20 and 21). In addition, the DMTC configures user equipment-specific using the DMTC transmission period and the DMTC offset (SF unit) (see FIG. 8). On the other hand, under the same condition, the user equipment may not perform the reception process for physical channels other than DRS (e.g., PDCCH, EPDCCH, and PDSCH for downlink transmission) in SF #n (i.e., omit the receiving process).

Additionally, when the number of occupied OFDM symbols of SF #n indicated by the common control signaling of SF #n (i.e., the LAA SF configuration) is not more than 12 OFDM symbols on which DRS transmission may be assumed based, for the transmission of DRS consisting of 12 OFDM symbols, the user equipment may recognize through the SF configuration that no DRS transmission is performed from the base station in SF #n. Therefore, the user equipment may not assume DRS transmission from the base station in SF #n, and may not perform DRS detection in SF #n. That is, only when the SF configuration information indicates that the number of OFDM symbols occupied in the SF #n is 12 or more, the user equipment may perform DRS detection assuming DRS transmission from the base station.

Next, transmission of PSS/SSS performing time/frequency synchronization will be described. When DL transmission is configured to be performed in the LAA SCell after LBT, the user equipment may not detect common control signaling (e.g., indicating the configuration of the ending partial SF) in the SF #(n−1) of the LAA SCell and may detect common control signaling only in the SF #n of the LAA SCell. Here, the Ending SF indicates SF #n based on the common control signaling of SF #(n−1). Accordingly, the configuration of SF #n is limited to partial SF (i.e., the number of OFDM symbols is less than 14). In this case, when SF #n is SF #0 /#5, the user equipment may perform time/frequency synchronization assuming PSS/SSS transmission in SF #n. On the other hand, under the same condition, the user equipment may not perform the reception process for physical channels other than DRS (e.g., PDCCH, EPDCCH, and PDSCH for downlink transmission) in SF #n (i.e., omit the receiving process).

Additionally, when the number of occupied OFDM symbols of SF #n indicated by the common control signaling (i.e., LAA SF configuration) of SF #n is seven or more, since PSS/SSS may be transmitted, the user equipment may perform PSS/SSS detection only in that case. On the other hand, when the number of occupied OFDM symbols of SF #n indicated by the common control signaling (i.e., LAA SF configuration) of SF #n is six or less, the user equipment may recognize that the PSS transmission may not be performed in the SF #n through the SF configuration. Therefore, the user equipment may not perform the PSS/SSS detection operation even if the SF #n is SF #0 /#5. Since PSS is transmitted at OFDM symbol index #6 and SSS is transmitted at OFDM symbol index #5, when the number of occupied OFDM symbols in SF #n is 6 or less, the user equipment may assume that the PSS/SSS is not transmitted from the base station in the SF #n and may not perform the PSS/SSS detection operation in the SF #n (i.e., omit the PSS/SSS detection operation).

As another example, when DL transmission is configured to be performed on the LAA SCell after LBT, regardless of the number of occupied OFDM symbols of SF #n indicated by common control signaling (i.e., LAA SF configuration) for PSS/SSS transmission of SF #0 /#5, user equipment may perform PSS/SSS detection process in SF #0/#5 and perform time/frequency synchronization according to the detection result of PSS/SSS, assuming that PSS/SSS is transmitted from base station.

Figure 23:
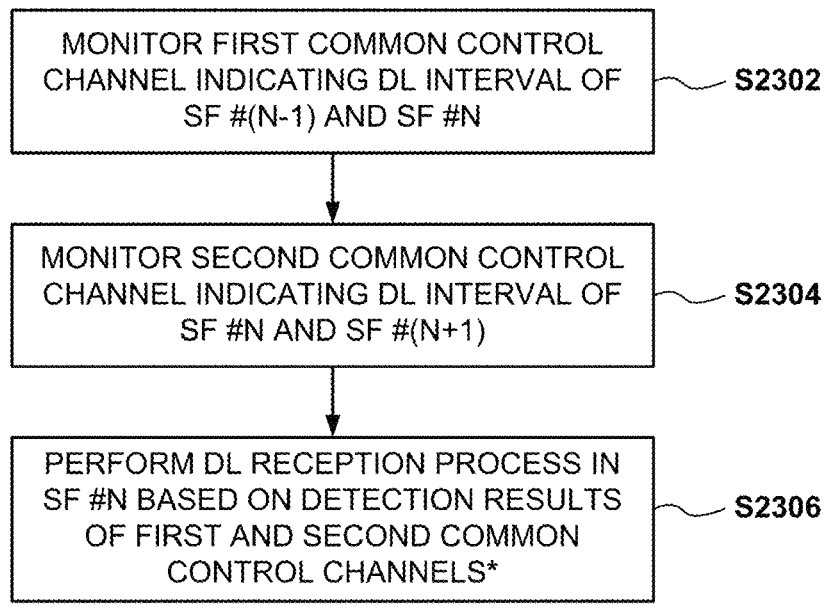
FIG. 23 illustrates a downlink receiving process according to an embodiment of the present invention.

FIG. 23 illustrates a downlink receiving process according to an embodiment of the present invention. This example may be applied when the DL transmission is configured to be performed on the LAA SCell after the LBT.

Referring to FIG. 23, the user equipment may monitor a first common control channel indicating downlink (DL) interval of SF #(n−1) and SF #n (S2302). The DL interval of SF #(n−1) and SF #n may be indicated by the number of OFDMs (available for DL transmission) and may be indicated using the subframe configuration information of Table 4. Also, the user equipment may monitor the second common control channel indicating the DL interval of SF #n and SF #(n+1) (S2304). The DL interval of SF #n and SF #(n+1) may be indicated by the number of OFDMs (available for DL transmission) and may be indicated using the subframe configuration information of Table 4. Here, the first common control channel may be monitored in SF #(n−1), and the second common control channel may be monitored in SF #n. Also, SF #n may be included in the time window in which DRS reception is expected. Here, the time window for expecting DRS reception may include a DMTC, and the DMTC may be configured on a cell of an unlicensed band. In addition, the first and second common control channels may include a PDCCH in which the CRC is scrambled by the CC-RNTI.

Thereafter, the user equipment may perform/control the DL reception process in the SF #n based on the detection results of the first and second common control channels (S2306). Here, when the user equipment fails to detect the first common control channel, the detection of the second common control channel is successful, and the number of OFDM symbols occupied for the SF #n indicated by the DL subframe configuration information in the SF #n through the detected common control channel is a part of the total OFDM symbols of the SF #n (i.e., partial SF), for the downlink reception process of the user equipment in the SF #n, only the detection process for the first physical channel/signal may be allowed. Here, the first physical channel/signal includes DRS. In this case, the reception process for the second physical channel/signal in the SF #n may be omitted. Here, the second physical channel/signal may include a PDCCH, an EPDCCH, and a PDSCH for downlink transmission. The PDCCH for uplink transmission may be included in the first physical channel/signal.

On the other hand, when the user equipment fails to detect the first common control channel, the detection of the second common control channel is successful, and the number of OFDM symbols occupied for the SF #n indicated by the DL subframe configuration information in the SF #n through the detected common control channel is 14 or less, that is, a part of the SF #n (i.e., partial SF), for the downlink reception process of the user equipment in the SF #n, only the detection process for the first physical channel/signal may be allowed. Here, the first physical channel/signal includes DRS. In this case, the reception process for the second physical channel/signal in the SF #n may be omitted. Here, the second physical channel/signal may include a PDCCH, an EPDCCH, and a PDSCH for downlink transmission.

On the other hand, when the user equipment fails to detect the first common control channel, the detection of the second common control channel is successful, and the number of OFDM symbols occupied for the SF #n indicated by the DL subframe configuration information in the SF #n through the detected common control channel is 12, for the downlink reception process of the user equipment in the SF #n, only the detection process for the first physical channel/signal may be allowed. Here, the first physical channel/signal includes DRS. In this case, the reception process for the second physical channel/signal in the SF #n may be omitted. Here, the second physical channel/signal may include a PDCCH, an EPDCCH, and a PDSCH for downlink transmission.

On the other hand, when the user equipment fails to detect the first common control channel, the detection of the second common control channel is successful, and the number of OFDM symbols occupied for the SF #n indicated by the DL subframe configuration information in the SF #n through the detected common control channel is 12 or less, the reception process for other physical channels/signals including DRS in the SF #n may be omitted. Here, a physical channel/signal other than DRS may include a PDCCH, an EPDCCH, and a PDSCH for downlink transmission.

On the other hand, if the detection of the first common control channel fails, the detection of the second common control channel is successful, and the DL interval of SF #n is all of SF #n (i.e., full SF), the downlink reception/detection process of the user equipment in the SF #n may be normally performed/allowed for all channels/signals (e.g., DRS, PDCCH, EPDCCH, and PDSCH). Also, if both the first and second common control channels are successfully detected, regardless of whether the DL interval of SF #n is a part of SF #n or not, the downlink reception/detection process of the user equipment in the SF #n may be normally performed/allowed for all channels/signals (e.g., DRS, PDCCH, EPDCCH, and PDSCH).

Figure 24:
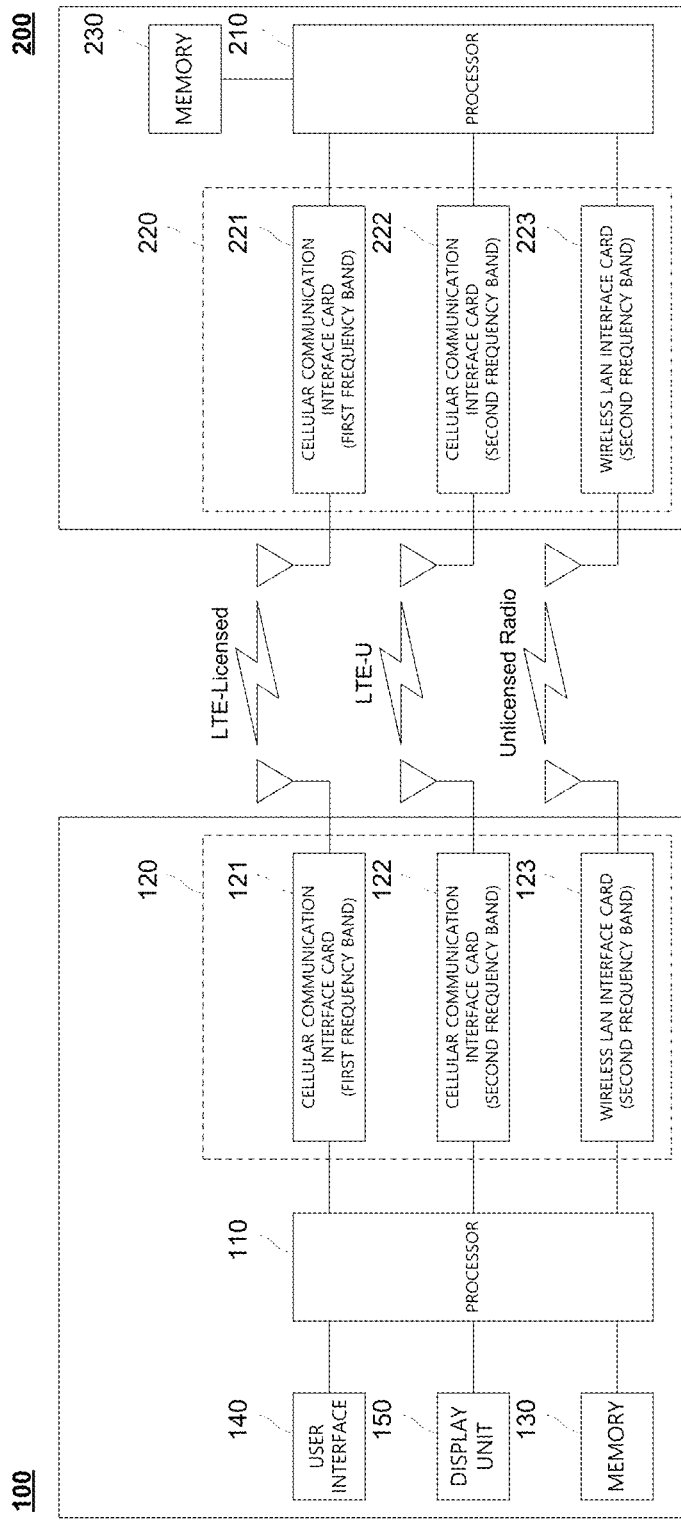
FIG. 24 illustrates a configuration of a user equipment and a base station according to an embodiment of the present invention.

FIG. 24 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be refered to as a station (STA), an Mobile Subscriber (MS), or the like. In the embodiment of present invention, the base station may control and manage a cell (eg, macrocell, femtocell, picosell, etc.) corresponding to a service area and perform function such as transmitting signal, designating channel, monitoring channel, self-diagnosis, relay. The base station may be referred to as an evolved NodeB(eNB), an access point (AP), or the like.

Referring to FIG. 24, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention. (See FIGS. 1 to 23.)

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In the figure, the communication module 120 is illustrated as the integrated module, but the respective network interface cards may be independently disposed according to a circuit configuration or a purpose unlike the figure.

The cellular communication interface card 121 transmits/receives a radio signal to/from at least one of a base station 200, an external device, and a server by using the mobile communication networkand provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may transmit/process the downlink transmission signal according to the proposal of the present invention. (See FIGS. 1 to 23.)

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In the figure, the communication module 220 is illustrated as the integrated module, but the respective network interface cards may be independently disposed according to the circuit configuration or the purpose unlike the figure.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In the figure, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspectsand are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is applicable to various communication devices used in a wireless communication system (e.g., a station using an unlicensed band communication, an access point, or a station using a cellular communication, a base station, etc.).

The invention claimed is:

1. A method for a user equipment to receive a downlink signal in a cellular communication system, the method comprising:
   monitoring a first common control channel indicating a downlink (DL) interval of subframe (SF) #(n-1) and SF #n;
   monitoring a second common control channel indicating a DL interval of SF #n and SF #(n+1); and
   performing a DL reception process in the SF #n based on a detection result of the first common control channel and a detection result of the second common control channel,
   wherein only a detection process for a Discovery Reference Signal (DRS) is allowed in the DL reception process in SF #n when a detection of the first common control channel fails, a detection of the second common control channel is successful, and the DL interval of SF #n indicated by the second common control channel is a part of a total orthogonal frequency division multiplexing (OFDM) symbols of SF #n,
   wherein the DL interval represents occupied OFDM symbols in a DL subframe.

2. The method of claim 1, wherein a reception process for a physical channel/signal is omitted in the DL reception process in SF #n when the detection of the first common control channel fails, the detection of the second common control channel is successful, and the DL interval of SF #n indicated by the second common control channel is a part of the total OFDM symbols of SF #n, wherein the physical channel/signal does not comprise the DRS.

3. The method of claim 2, wherein the physical channel/signal comprises a Physical Downlink Control Channel (PDCCH), an Enhanced PDCCH (EPDCCH), and a Physical Downlink Shared Channel (PDSCH) for downlink transmission.

4. The method of claim 1, wherein the first common control channel is monitored in SF #(n-1), and the second common control channel is monitored in SF #n.

5. The method of claim 4, wherein SF #n is comprised in a time window expecting DRS reception.

6. The method of claim 5, wherein the time window expecting the DRS reception comprises a DRS Measurement Timing configuration (DMTC).

7. The method of claim 6, wherein the DMTC is configured in a cell of an unlicensed band.

8. The method of claim 1, wherein the first and the second common control channels comprise a Physical Downlink Control Channel (PDCCH) scrambled with a Cyclic Redundancy Check (CRC) by a Common Control Radio Network Temporary Identifier (CC-RNTI).

9. A user equipment used in a cellular wireless communication system, the user equipment comprising:
a wireless communication module; and
a processor,
wherein the processor is configured to monitor a first common control channel indicating a downlink (DL) interval of subframe (SF) #(n-1) and SF #n;
monitor a second common control channel indicating a DL interval of SF #n and SF #(n+1); and
perform a DL reception process in the SF #n based on the detection a result of the first common control channel and a result of the detection of result of second common control channel,
wherein only a detection process for a Discovery Reference Signal (DRS) is allowed in the DL reception process in SF #n, when the detection of the first common control channel fails, the detection of the second common control channel is successful, and the DL interval of SF #n indicated by the second common control channel is a part of a total orthogonal frequency division multiplexing (OFDM) symbols of SF #n,
wherein the DL interval represents occupied OFDM symbols in a DL subframe.

10. The user equipment of claim 9,
wherein a reception process for a physical channel/signal is omitted in the DL reception process in SF #n when the detection of the first common control channel fails, the detection of the second common control channel is successful, and the DL interval of SF #n indicated by the second common control channel is a part of the total OFDM symbols of SF #n, wherein the physical channel/signal does not comprise the DRS.

11. The user equipment of claim 10, wherein the physical channel/signal comprises a Physical Downlink Control Channel (PDCCH), an Enhanced PDCCH (EPDCCH), and a Physical Downlink Shared Channel (PDSCH) for downlink transmission.

12. The user equipment of claim 9, wherein the first common control channel is monitored in SF #(n-1), and the second common control channel is monitored in SF #n.

13. The user equipment of claim 12, wherein SF #n is comprised in a time window expecting DRS reception.

14. The user equipment of claim 13, wherein the time window expecting the DRS reception comprises a DRS Measurement Timing configuration (DMTC).

15. The user equipment of claim 14, wherein the DMTC is configured in a cell of an unlicensed band.

16. The user equipment of claim 9, wherein the first common control channel and the second common control channel comprise a Physical Downlink Control Channel (PDCCH) scrambled with a Cyclic Redundancy Check (CRC) by a Common Control Radio Network Temporary Identifier (CC-RNTI).

* * * * *